(12) United States Patent
DiMasi

(10) Patent No.: US 12,025,784 B2
(45) Date of Patent: Jul. 2, 2024

(54) LIGHT CONCENTRATOR AND LIGHT CONCENTRATION METHOD

(71) Applicants: BrightSpace Technologies, Inc., Louisville, CO (US); Joseph DiMasi, Louisville, CO (US)

(72) Inventor: Joseph DiMasi, Louisville, CO (US)

( * ) Notice: Subject to any disclaimer, the term of this patent is extended or adjusted under 35 U.S.C. 154(b) by 0 days.

(21) Appl. No.: 18/272,272

(22) PCT Filed: Jan. 14, 2022

(86) PCT No.: PCT/US2022/012615
§ 371 (c)(1),
(2) Date: Jul. 13, 2023

(87) PCT Pub. No.: WO2022/155531
PCT Pub. Date: Jul. 21, 2022

(65) Prior Publication Data
US 2024/0036298 A1    Feb. 1, 2024

Related U.S. Application Data

(60) Provisional application No. 63/137,718, filed on Jan. 14, 2021.

(51) Int. Cl.
*G02B 19/00* (2006.01)

(52) U.S. Cl.
CPC ..... *G02B 19/0042* (2013.01); *G02B 19/0028* (2013.01)

(58) Field of Classification Search
CPC . G02B 19/0042; G02B 19/0028; G02B 27/09
See application file for complete search history.

(56) References Cited

U.S. PATENT DOCUMENTS

| 5,168,401 A | * | 12/1992 | Endriz | G02B 19/0057 359/627 |
| 5,319,496 A | * | 6/1994 | Jewell | G02B 27/123 359/741 |
| 5,784,203 A | | 7/1998 | Beckman | |
| 6,044,096 A | * | 3/2000 | Wolak | G02B 19/0057 372/109 |

(Continued)

FOREIGN PATENT DOCUMENTS

WO    WO-2010061699 A1  *  6/2010   ......... G02B 19/0028

OTHER PUBLICATIONS

International Search Report and Written Opinion of the International Searching Authority for International Patent Application No. PCT/US2022/012615 dated Jul. 25, 2022, 11 pages.

*Primary Examiner* — Collin X Beatty
(74) *Attorney, Agent, or Firm* — Cozen O'Connor

(57) ABSTRACT

A method for concentrating light includes converting each section of a plurality of distinct collinear sections of incident illumination into a respective one of a plurality of collimated beams. The plurality of collimated beams forms a beam-array having an initial beam-array width in an incidence plane that intersects each of the plurality of distinct collinear sections. The method also includes decreasing a width of the beam-array from the initial beam-array width to a concentrated beam-array width that is less than a total width of the plurality of distinct collinear sections in the incidence plane.

20 Claims, 16 Drawing Sheets

(56) References Cited

U.S. PATENT DOCUMENTS

| | | | | |
|---|---|---|---|---|
| 7,653,115 | B2* | 1/2010 | Yamaguchi | G02B 19/0057 |
| | | | | 372/100 |
| 8,804,246 | B2* | 8/2014 | Wolak | G02B 19/0028 |
| | | | | 359/623 |
| 9,971,109 | B1* | 5/2018 | Wu | G02B 6/4215 |
| 10,261,261 | B2 | 4/2019 | Hemenway et al. | |
| 2017/0176758 | A1* | 6/2017 | Lerner | G02B 27/0927 |
| 2019/0187360 | A1 | 6/2019 | Nichol et al. | |
| 2019/0221990 | A1 | 7/2019 | Hemenway et al. | |
| 2021/0325021 | A1* | 10/2021 | Hikmet | F21V 7/18 |

* cited by examiner

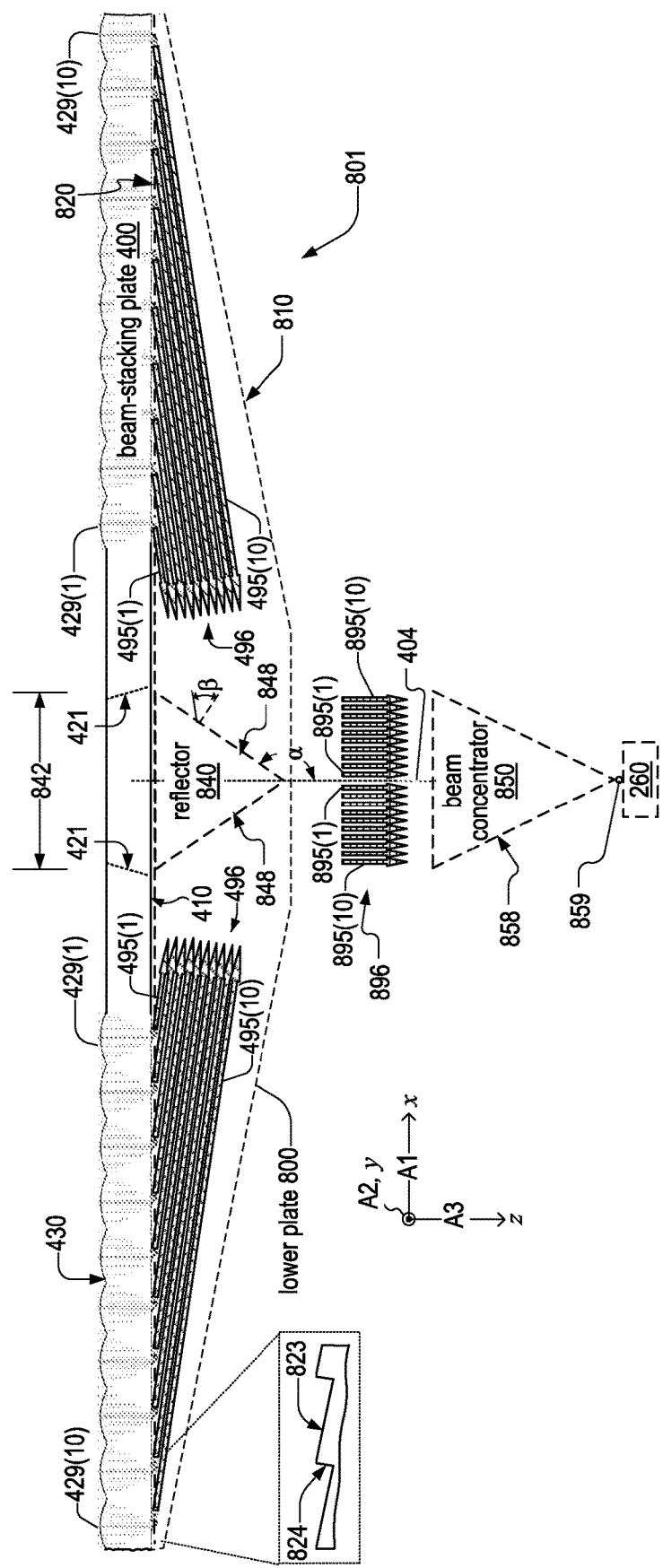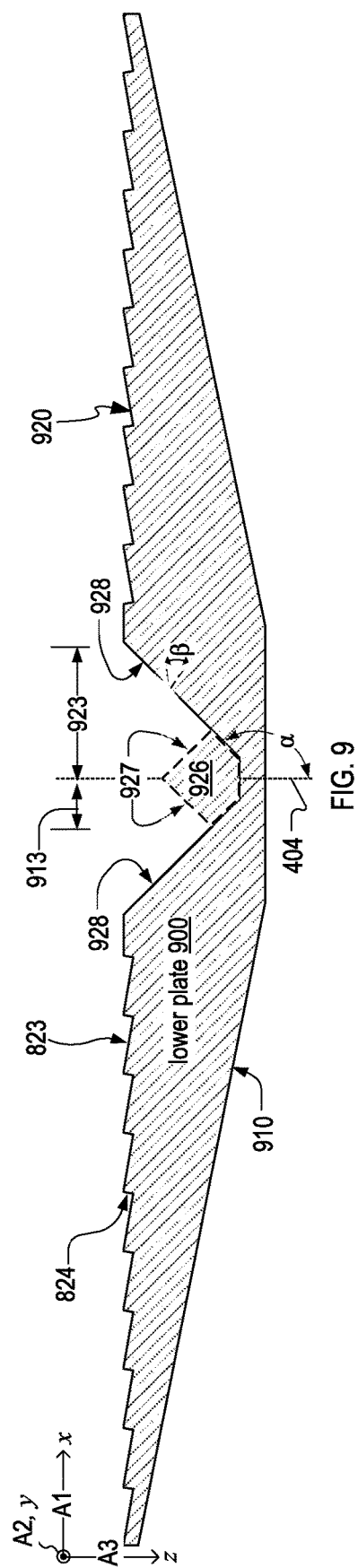

LIGHT CONCENTRATOR AND LIGHT CONCENTRATION METHOD

CROSS-REFERENCE TO RELATED APPLICATIONS

This application benefits from and claims priority to U.S. provisional patent application Ser. No. 63/137,718, filed on Jan. 14, 2021, the disclosure of which is incorporated herein by reference in its entirety.

FIELD OF THE INVENTION

Embodiments of the present invention relate to solar energy collection systems and, more specifically, systems and methods for collecting solar energy and directing the collected solar energy to desired locations.

BACKGROUND

Electrical lighting represents about twenty percent of electricity use in the United States, including electrical power consumed for light generation and for space-cooling to accommodate light bulb heat gains from lighting inefficiencies, with commercial buildings using more interior space lighting than all other sectors combined. A great majority of interior space lighting in commercial buildings occurs during daylight hours, and the potential for using solar interior lighting for such applications has long been recognized.

One approach for solar interior lighting is the use of sky lights, essentially windows in a roof. This approach, however, requires direct solar collection into the space to be lighted, essentially limiting the technique to single-story buildings. A second approach is to collect solar light and conduct the light to an interior space where the light is needed. For example, light wells and internally-reflective light ducts represent simple light conduction techniques, with the drawback that such devices are challenging to route to the desired illumination location, consume large volumes of building space, and can interfere with building architecture.

Alternatively, attempts have been made to concentrate collected solar light by several hundred times or more and transmit the concentrated light to interior spaces using optical fibers. For instance, one approach is to concentrate the light using a concentrating mirror, and feed the concentrated light into optical fibers. A significant problem with this approach is the potential for significant heat generation in equipment used to concentrate the light and to direct the concentrated light into the optical fibers, especially due to the infrared radiation component of collected solar light. While previous research work reduces thermal problems by removing infrared radiation from the concentrated light prior to introduction of the concentrated light into the optical fibers, the technique still requires the use of expensive equipment, such as extremely precise solar trackers and/or high-cost glass optical fibers.

As a different approach, lower cost components, such as less precise solar trackers and/or plastic optical fibers, can be used for lower light concentration factors. However, the light collection and delivery performance suffer at lower light concentration. Thus, solar light collection systems tend to be highly customized for each installation and not readily adaptable to other situations. Practical, robust, and cost-effective solar interior lighting solutions applicable for a wide variety of interior lighting situations remain elusive.

SUMMARY OF THE EMBODIMENTS

In a first aspect, a method for concentrating light includes converting each section of a plurality of distinct collinear sections of incident illumination into a respective one of a plurality of collimated beams. The plurality of collimated beams forms a beam-array having an initial beam-array width in an incidence plane that intersects each of the plurality of distinct collinear sections. The method also includes decreasing a width of the beam-array from the initial beam-array width to a concentrated beam-array width that is less than a total width of the plurality of distinct collinear sections in the incidence plane.

In a second aspect, a method for concentrating light includes converting an annular illumination-section incident on an annular top-surface region of a beam-stacking plate to an annular-beam. The annular beam (a) propagates radially inward toward a common axis intersecting a center of the annular top-surface region, (b) is collimated in a meridional plane, of the beam-stacking plate, that includes a common axis and (c) is annular in a transverse plane perpendicular to the common axis. The method also includes redirecting the annular-beam as a concentrated beam that propagates away from the beam-stacking plate.

In a third aspect, a light concentrator includes a beam-stacking plate including (i) a plate entrance-surface, (ii) a plurality of focusing-sections and, opposite the plate entrance-surface, (ii) an exit-surface that includes a plurality of protrusions each aligned with a respective one of the plurality of focusing-sections.

In a fourth aspect, light concentrator includes a beam-stacking plate and an axially-symmetric reflector. The beam-stacking plate includes (i) a plate entrance-surface, (ii) a plurality of annular focusing-sections concentric about a common axis and, opposite the plate entrance-surface, (ii) an exit-surface. The exit surface includes a plurality of annular protrusions that are concentric about the common axis and aligned with a respective one of the plurality of annular focusing-sections. Each annular focusing section and annular protrusion aligned thereto functions as a respective beam-minifying annulus that collimates incident illumination to an array of stacked beams. The axially-symmetric reflector redirects the array of stacked beams as concentrated beams that propagate parallel to or substantially parallel to the common axis.

BRIEF DESCRIPTION OF THE FIGURES

FIG. 8 is a cross-sectional view of a light concentrators that includes a lower plate, in an embodiment.

FIG. 9 is a schematic cross-sectional view of a lower plate, which is an example of the lower plate of FIG. 8.

DETAILED DESCRIPTION OF THE EMBODIMENTS

Figure 1:
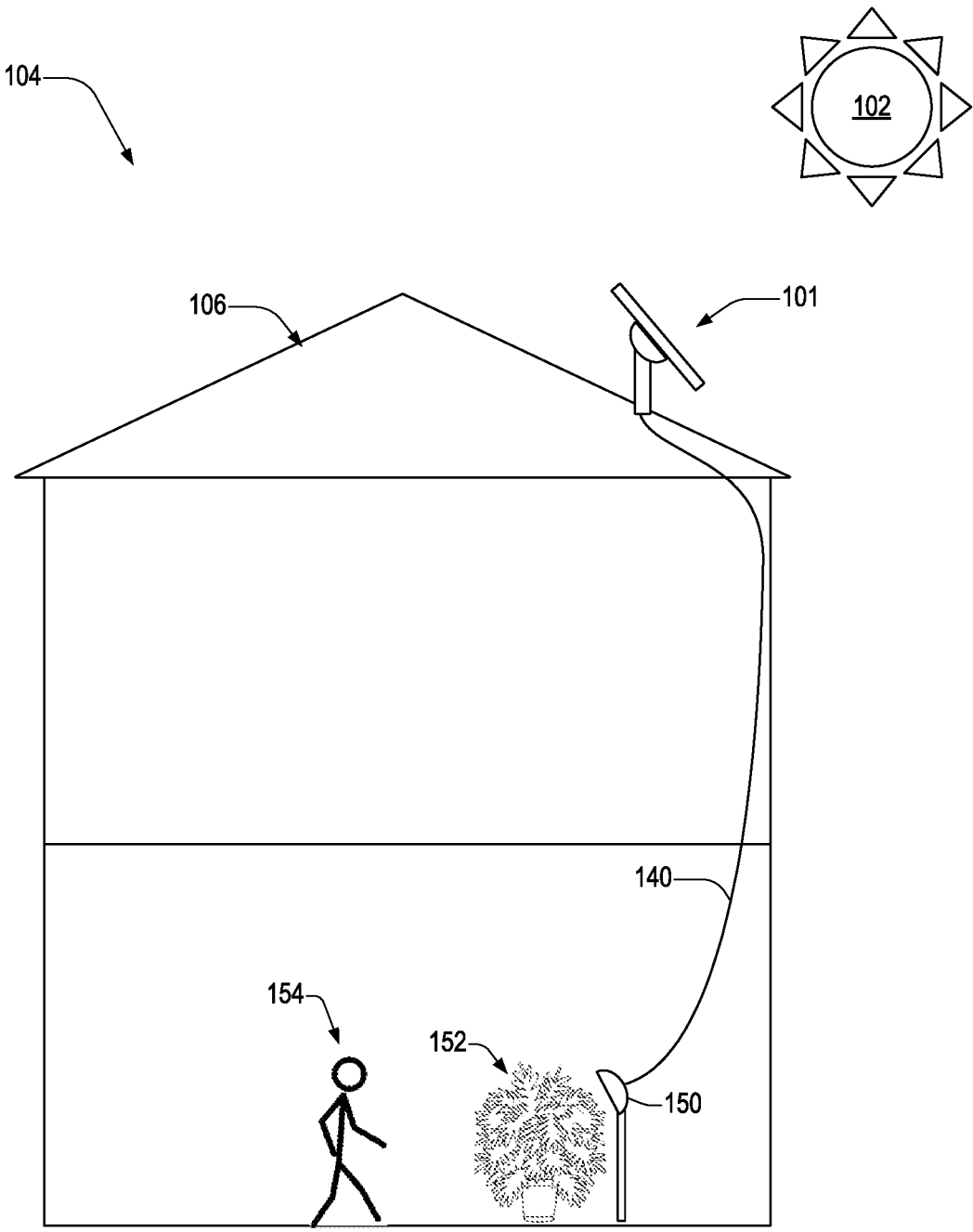
FIG. 1 illustrates an embodiment of a light concentrator installed on a roof of a building.

FIG. 1 illustrates an installation of a solar lighting system, in accordance with an embodiment. As shown in FIG. 1, a building 104 includes a roof 106 on which a light concentrator 101 is installed. Light concentrator 101 gathers solar light from the sun 102 and directs the collected light through an optical fiber 140. Optical fiber 140 may be connected with an indoor light mechanism 150 such that the solar light can be used to light a plant 152 and/or a person 154, for example, at a location inside building 104 that otherwise is not directly exposed to solar light. The use scenario of light concentrator 101 in FIG. 1 is not limiting, for example, light concentrator 101 may be used for other applications, such concentrator photovoltaic (CPV) and solar thermal applications.

Figure 2:
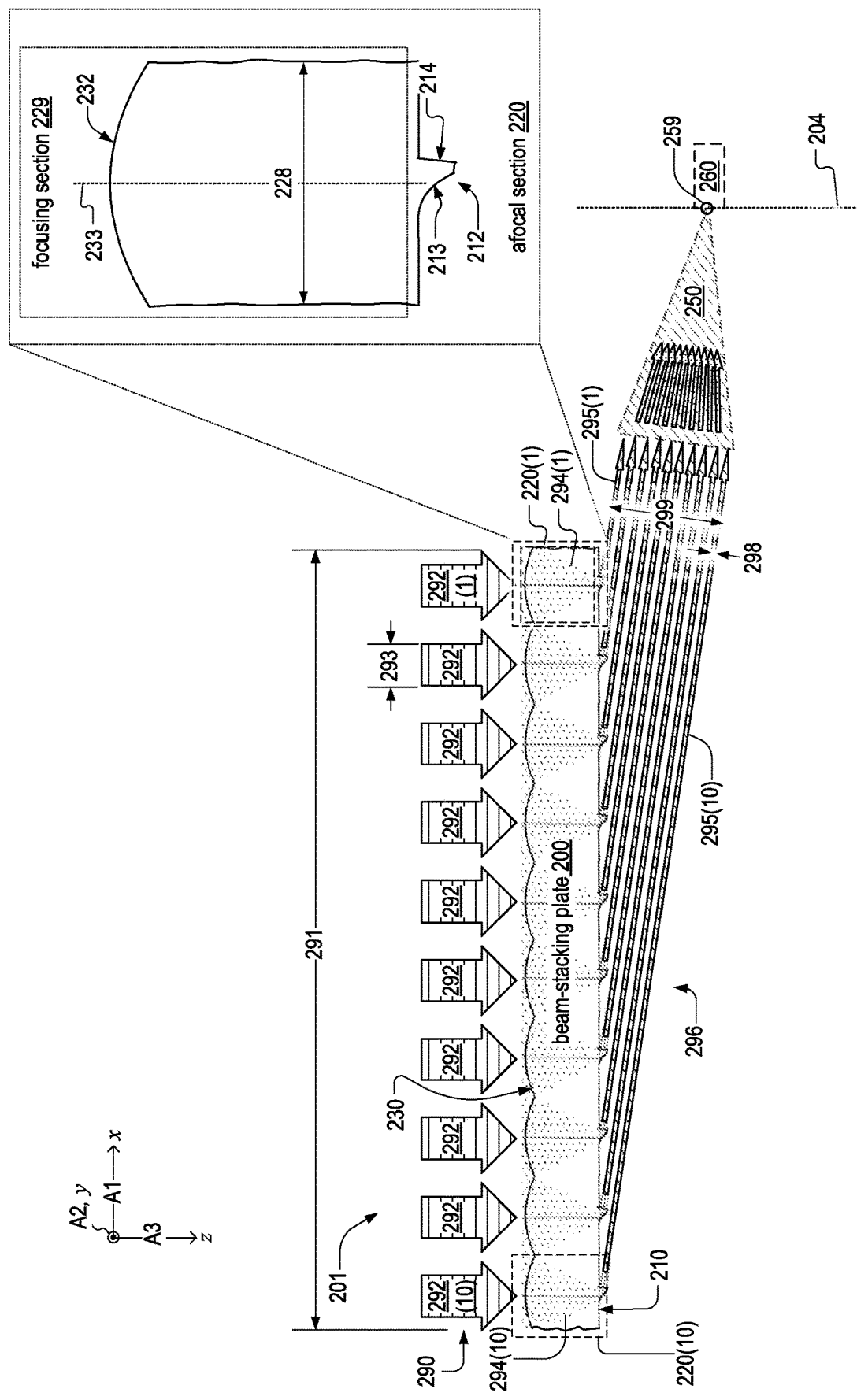
FIG. 2 is a cross-sectional view of a light concentrator that includes a beam-stacking plate, in an embodiment.

FIG. 2 is a cross-sectional view of a light concentrator 201, which is an example of light concentrator 101. The cross-section illustrated in FIG. 2 is parallel to a plane, hereinafter the x-z plane, formed by orthogonal axes A1 and A3, which are each orthogonal to an axis A2. Herein, the x-y plane is formed by orthogonal axes A1 and A2, and planes parallel to the x-y plane are referred to as transverse planes. Unless otherwise specified, heights and depths of objects herein refer to the object's extent along axis A3. Herein, a reference to an axis x, y, or z refers to axes A1, A2, and A3 respectively. Also, herein, a horizontal plane is parallel to the x-y plane, a width refers to an object's extent along the x or y axis respectively, and a vertical direction is along the z axis.

Light concentrator 201 includes a beam-stacking plate 200, which includes a plate-entrance surface 230, a plurality of focusing sections 229, and an exit-surface 210 opposite plate-entrance surface 230. Exit-surface 210 includes a plurality of protrusions 212 each aligned with a respective focusing section 229. Each focusing section 229 and protrusion 212 form a respective one of a plurality of afocal sections 220.

Beam-stacking plate 200 and other optical components disclosed herein may be formed of an optically transparent material, examples of which include plastics, acrylics, copolymers, Zeonex, glass, and silicone. Focusing section has a width 228, which may be between 0.25 millimeters and 2.5 millimeters. For example, width 228 is between 0.75 and 1.5 millimeters.

Each protrusion 212 includes a first surface 213 and an exit-port surface 214. Each focusing section 229 has a top surface 232 and a symmetry plane 233. Top surface 232 is part of plate-entrance surface 230. Protrusion 212 may be aligned with focusing section 229 such that symmetry plane 233 intersects one of first surface 213 and exit-port surface 214. To minimize beam divergence or to maintain total internal reflection of beams 294 at first surface 213, protrusion 212 may be laterally offset from symmetry plane 233 along axis A1.

Each afocal section 220 may function as an afocal beam-minifying telescope. Herein, the terms minify and demagnify are synonymous, such that a beam-minifying telescope as a beam-demagnifying telescope, for example. In embodiments, surfaces 232, 213, and 214 cooperate to function as the afocal beam-minifying telescope. For example, when surface 232 is convex, first surface 213 is planar, and exit-port surface 214 is externally convex, the beam-minifying telescope is a dioptric Keplerian telescope. In embodiments, surface 232 is convex and either: (i) first surface 213 is planar and exit-port surface 214 is externally concave, or (ii) first surface 213 is externally concave and exit-port surface 214 is planar. In such embodiments, beam-minifying telescope is a Galilean telescope, in dioptric and catadioptric formations, respectively.

In embodiments, first surface 213 is internally convex and exit-port surface 214 is planar. In other embodiments, first surface 213 is planar and exit-port surface 214 is either externally convex or externally concave. Herein, a surface that is internally convex is externally concave, as the surface is concave from a perspective outside of the material that forms surface. Similarly, surface that is internally concave is externally convex, as the surface is convex from a perspective outside of the material that forms surface.

Each of top surfaces 232 may be convex, in which case, plate-entrance surface 230 is a lenticular surface. In embodiments, each focusing section 229 has a graded refractive index, and functions as a graded-index lens, such as a graded-index lens that functions as a cylindrical lens. In such embodiments, each top surface 232 may be planar and may be part of a respective focusing section 229.

FIG. 2 illustrates illumination 290 incident on plate-entrance surface 230 in the x-z plane. Illumination 290 has a width 291 and includes a plurality of contiguous illumination sections 292. Each focusing section 229 converts a respective illumination section 292 to a respective uncollimated beam 294. Each protrusion 212 converts a respective uncollimated beam 294 into a respective one of a plurality of collimated beams 295 that form a beam-array 296, also referred to herein as an array of stacked beams. Hence, each afocal section 220 converts a respective illumination section 292 to a respective collimated beam 295. For example, afocal sections 220(1,10) convert respective illumination sections 292 to collimated beams 295(1,10).

Beam-array 296 has a beam-array width 299 in an incidence plane that intersects each of the plurality of distinct collinear sections. Width 299 is less than width 291. Similarly, a width 293 each illumination section 292($k$) is greater than a respective width 298 of beam 295($k$), where index k is a positive integer.

Each collimated beam 295($k$) propagates in a respective one of a plurality of second directions that differs from a propagation direction of illumination section 292($k$) by at least forty-five degrees, and for increased demagnification, at least sixty degrees. A maximum difference between any pair of the plurality of second directions is less than ten degrees Beam-stacking plate 200 may include a secondary concentrator 250 that faces each exit-port surface 214. Secondary concentrator 250 may focus collimated beams 295 to a focal volume 259 that intersects a symmetry element 204. Focal volume may be a line focus, and a focal point, e.g., when symmetry element 204 is a vertical plane and a vertical axis, respectively. Secondary concentrator 250 may include at least one of a focusing element (either refractive or reflective) and a waveguide. Examples of focusing elements include refractive lenses, diffractive lenses, and concave mirrors such as parabolic reflectors. The waveguide may be a dielectric waveguide, and include a tapered section, such as an adiabatic taper or a dielectric concentrator configuration. Examples dielectric concentrator configurations include compound parabolic concentrators, compound hyperbolic concentrators, compound elliptical concentrators, and linear tapers.

In embodiments, light concentrator 201 includes a receiver 260 that is optically coupled to secondary concentrator 250 such that it receives or couples beam-array 296 at focal volume 259. Receiver 260 may include at least one of each of the following: an optical fiber, a photodetector, a solar cell, or a thermal absorber. For example, receiver 260 may include an array of optical fibers, and photodetector array, a solar-cell array, or a thermal-absorber array, where the array may be one-dimensional or two-dimensional.

Figure 3:
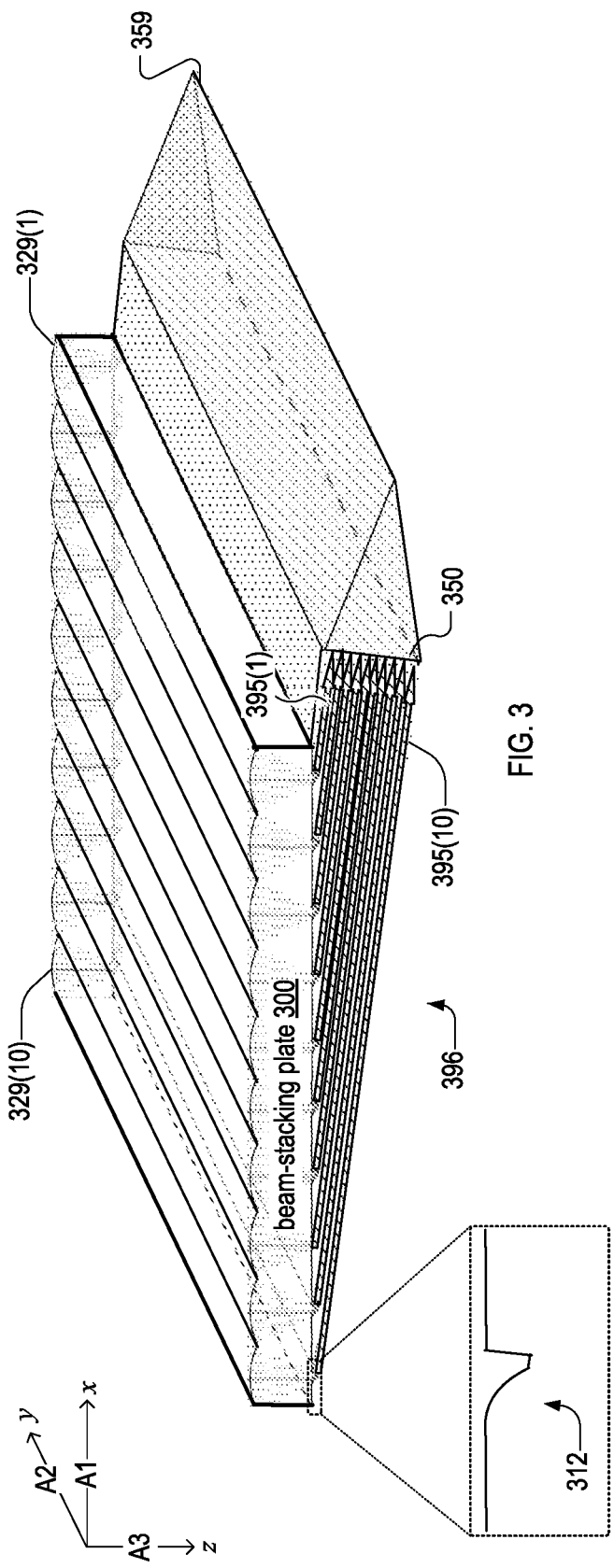
FIG. 3 is a schematic of a beam-stacking plate, which is an example of a beam-stacking plate of the light concentrator of FIG. 2, in an embodiment.

FIG. 3 is a schematic of a beam-stacking plate 300, which is an example of beam-stacking plate 200. The cross-sectional view of FIG. 2 represents cross-sections of beam-stacking plate 300 in planes parallel to the x-z plane. Beam-stacking plate 300 includes a plurality of focusing sections 329, each of which has a respective protrusion 312. Each focusing section 329 and protrusion 312 is an example of focusing section 229 and protrusion 212 respectively. Each focusing section 329 is parallel along axis A2, and each protrusion 312 is parallel to the focusing section 329 to which protrusion 212 is aligned.

Beam-stacking plate 300 is shown producing a plurality of collimated beams 395, which are examples of collimated beams 295. Collimated beams 395 form a beam-array 396, which is an example of beam-array 296. Beam-stacking plate may include a secondary concentrator 350, which is an example of secondary concentrator 250. Secondary concentrator 350 concentrates collimated beams 395 to a line focus 359, which is an example of focal volume 259. For clarity of illustration, not all collimated beams 395 are denoted with a reference numeral. When light concentrator 201 includes beam-stacking plate 300, receiver 260 may be a one-dimensional array along a direction parallel to axis A2 such that beams 395 converge at receiver 260 as line focus 359.

Figure 4:
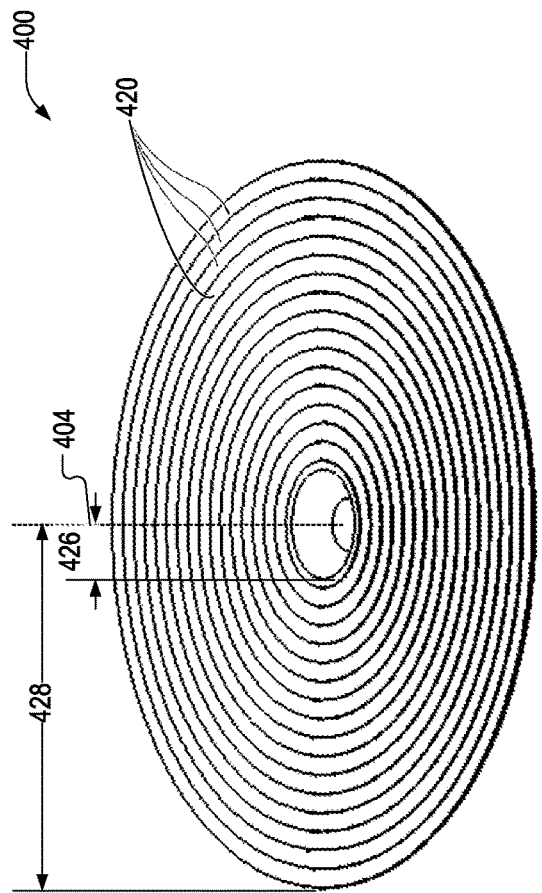
FIGS. 4 and 5 are respective views of a beam-stacking plate, which is an example of beam-stacking plate of FIG. 2.
Figure 5:
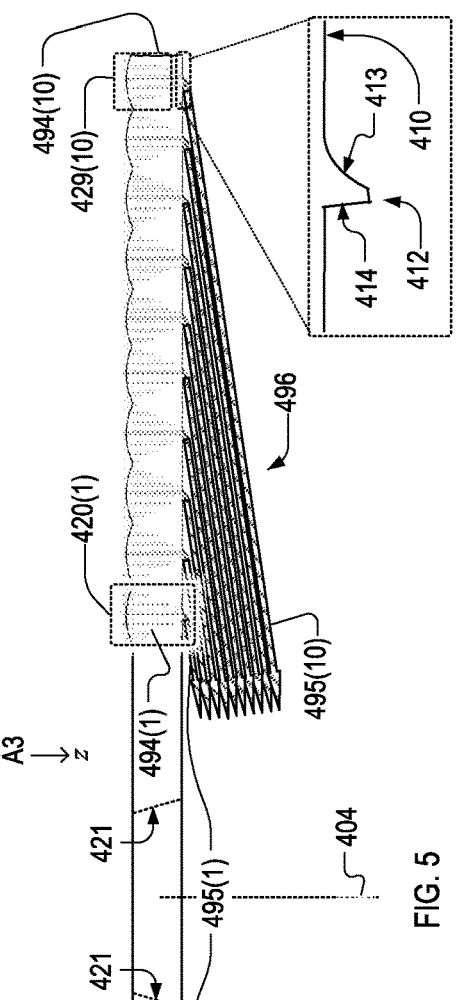

In embodiments, symmetry element 204 is a symmetry axis, and beam-stacking plate 200 is axially symmetric thereabout, such that each focusing section 229 and each protrusion 212 is concentric about symmetry element 204. For example, FIGS. 4 and 5 are respective views of a beam-stacking plate 400, which is an example of beam-stacking plate 200. Beam-stacking plate 400 includes a plurality of annular focusing sections 429(1-10) that are concentric about an axis 404, which is an example of symmetry element 204. Axis 404 is perpendicular to the x-y plane. In embodiments, beam-stacking plate 200 is rotationally symmetric about symmetry element 204, where the symmetry may be n-fold symmetry (e.g., n≥5).

Each focusing section 429 is an example of focusing section 229. The cross-sectional view of FIG. 2 represents cross-sections of beam-stacking plate 400 in a plane that is perpendicular to the x-y plane extends radially from axis 404.

Beam-stacking plate 400 has a plate-entrance surface 430 and an exit-surface 410, which are respective examples of surfaces 230 and 210. Exit-surface 410 includes a plurality of annular protrusions 412, each of which (i) is concentric about axis 404, and (ii) includes an outer protrusion-surface 413 and an inner protrusion-surface 414 between outer protrusion-surface 413 and axis 404. Protrusions 412, surfaces 413, and surface 414 are respective examples of protrusions 212, surface 213, and surface 214. Each focusing section 429 and annular protrusion 412 aligned thereto form a respective one of a plurality of concentric annular afocal sections 420. Each afocal section 420 is an example of afocal section 220. Herein, the term annular used to describe an element, such as annular protrusions 412 and annular focusing sections 429, means that a cross-section of the element is an annulus in a plane perpendicular to a symmetry axis of the element, where the shape of the annulus may be circular, elliptical, or polygonal in the plane.

When light concentrator 201 includes beam-stacking plate 400, beam-stacking plate 400 converts illumination 290 into a plurality of annular beams 495, each of which has a circular wavefronts (in a horizontal plane), is concentric about axis 404, and have wavevectors pointing to axis 404. In such embodiments, each illumination section 292 is an annular illumination-section. Each annular beam 495 is an example of a collimated beam 295, and form a beam-array 496, which is an example of beam-array 296. Each annular focusing section 429 and annular protrusion 412 aligned thereto function as a beam-minifying annulus that collimates and demagnifies (minifies) a respective illumination section 292.

FIG. 5 illustrates annular beams 495(1-10) each produced by a respective annular focusing section 429(1-10). For example, FIG. 5 denotes an afocal section 420(10) that includes a focusing section 429(10) and annular protrusion 412(10). Focusing section 429(10) converts illumination section 292(10) to a refracted beam 494(10), and annular protrusion 412(10) redirects and collimates refracted beam 494(10) to produce radially-converging collimated annular beam 495(10). For clarity of illustration, not all focusing sections 429(1,10) and annular beams 495 are denoted with a reference numeral.

Annular focusing sections 429 span radial distances between a minimum radius 426 and a maximum radius 428 from axis 404. Between surfaces 410 and 430, beam-stacking plate 400 may include an inner-surface 421 that defines an aperture through beam-stacking plate 400 centered about axis 404.

Figure 6:
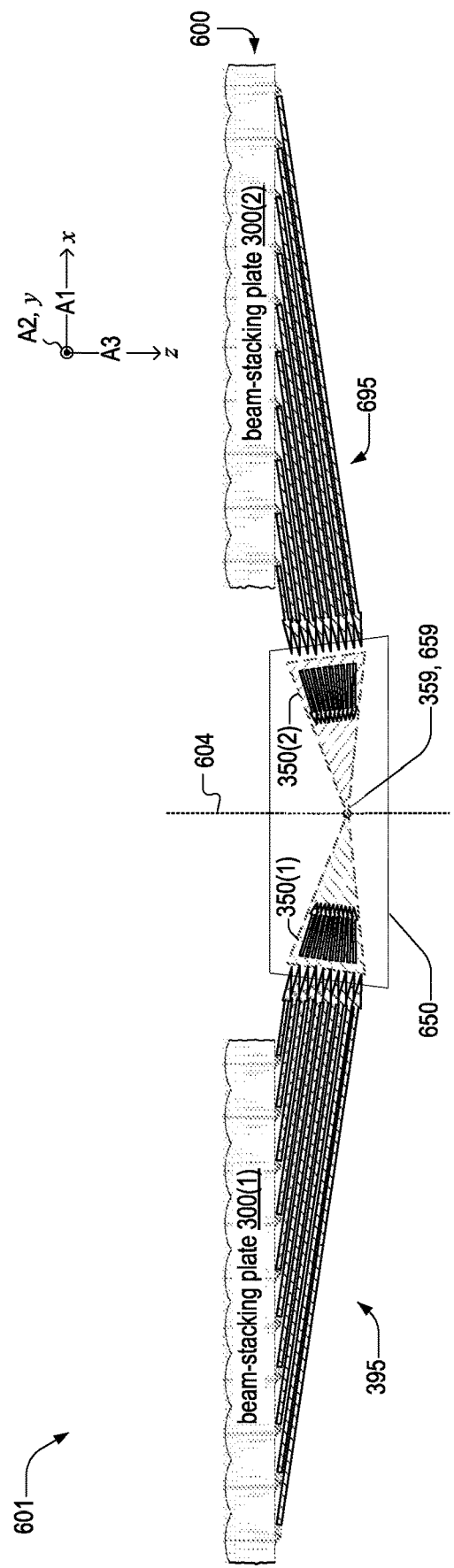
FIGS. 6 and 7 are cross-sectional views of respective light concentrators, each of which is an embodiment of the light concentrator of FIG. 1.

FIG. 6 is a cross-sectional view of a light concentrator 601, which is an example of light concentrator 101 that includes a beam-stacking plate 600 and a secondary concentrator 650. Beam-stacking plate 600 includes two opposite-facing beam-stacking plates 300(1,2) that are symmetric about a plane 604, which is parallel to the y-z plane. Beam-stacking plates 300(1) and 300(2) creates collimated beams 395 and collimated beams 695 respectively, each of which propagate toward plane 604. Beams 695 are examples of beams 395.

Secondary concentrator 650 includes secondary concentrators 350(1,2) Secondary concentrator 350(1) concentrates collimated beams 395 form line focus 359. Secondary concentrator 350(2) concentrates collimated beams 695 to form a line focus 659 that is collinear with line focus 359. When light concentrator 201 includes beam-stacking plate 600, receiver 260 may be a one-dimensional array along a direction parallel to axis A2 such beams 395 and 695 converge, at receiver 260, as line focus 359 and line focus 659 respectively.

Beam-stacking plate 600 may be a single element such that beam-stacking plates 300(1,2) correspond to respective areas of a same single volume of material. Similarly, secondary concentrator 650 may be a single element such that secondary concentrators 350(1,2) correspond to respective areas of a same single volume of material.

Figure 7:
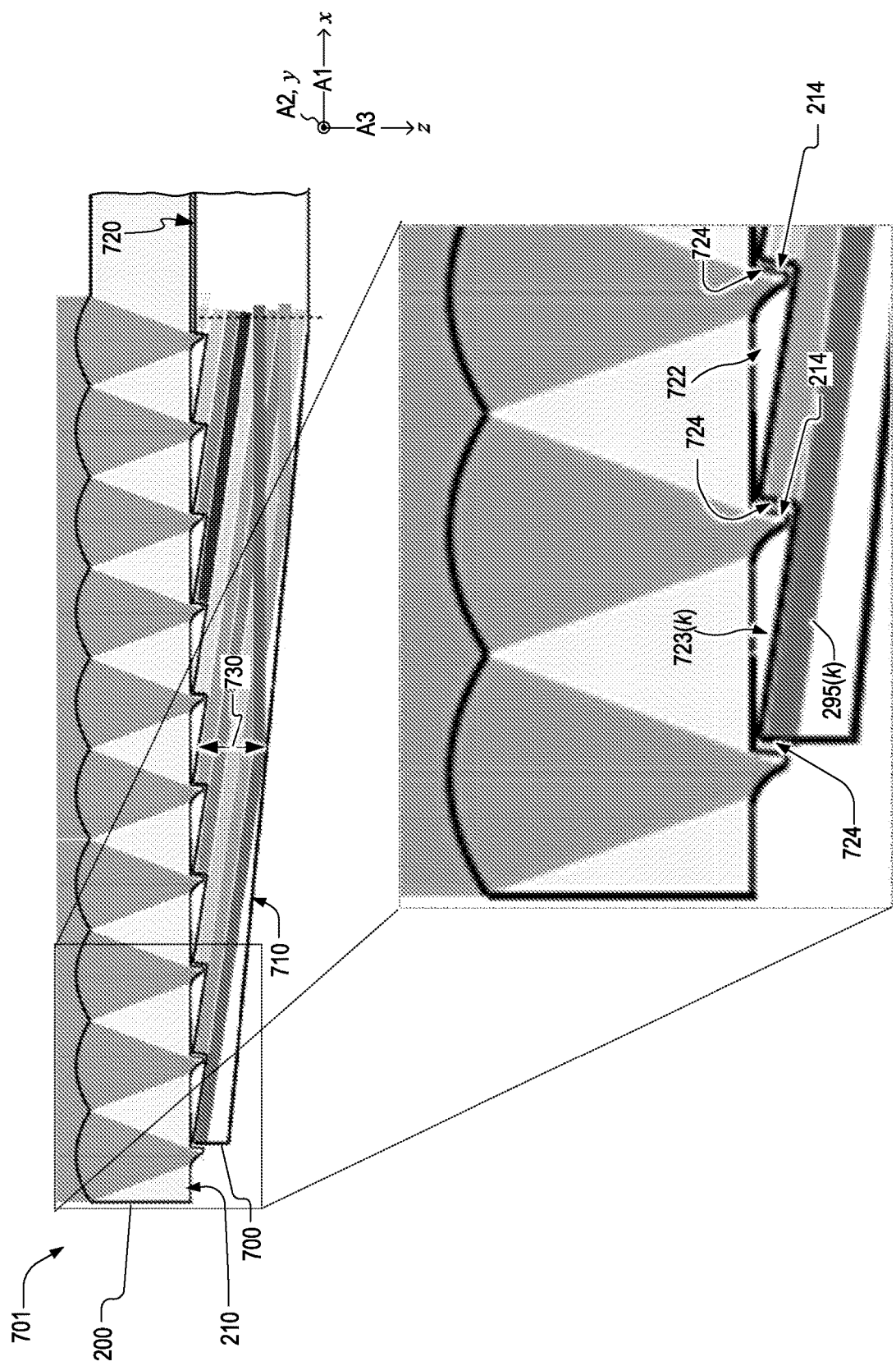

FIG. 7 is a cross-sectional view of a light concentrator 701 that includes beam-stacking plate 200 and a lower plate 700. Lower plate 700 has a lower-plate bottom-surface 710, and lower-plate top-surface 720, which faces exit-surface 210. Lower-plate top-surface 720 includes a plurality of entrance-port surfaces 724 that each form part of a respective one of a plurality of grooves 722. Between each pair of adjacent entrance-port surfaces 724 is a surface-region 723 that, with surface 724, forms a groove 722.

Each surface-region 723 may be planar, in which case grooves 722 yield a sawtooth profile as part of lower-plate top-surface 720 in the x-z plane. When surface-regions 723 are planar, each surface-region 723 may be oriented at an angle that is parallel to a propagation direction of the collimated beam 295 propagating adjacent to it in lower plate 700. For example, FIG. 7 illustrates collimated beam 295(k) adjacent to surface-region 723(k), where k is a positive integer. Edge of collimated beam 295(k) may undergo total-internal-reflection off of surface-region 723(k), which reduces the net beam divergence of beam-array 296, which facilitates coupling of beam-array 296 into an optical waveguide, such as a slab waveguide or an optical fiber.

One or more surface regions 723 may be parallel to lower-plate bottom surface 710. In embodiments, each surface regions 723 is parallel to lower-plate bottom surface 710. A benefit of this parallelism is to maintain collimation, and minimize beam divergence, of beam-array 296. For example, although surfaces 723(k) and 710 may be aligned parallel to central beam direction 295(k), at least one of beams 295, those furthest away from symmetry element 204 for example, may strike bottom surface 710 and reflect upward from surface 710. In embodiments, e.g., when afocal section 220 has high demagnification and/or the ratio of thickness 730 to width 291 is large, extreme downward divergent rays may also reflect upon a surface-region 723. Parallelism of surface 710 and surface-regions 723 negates any net angular change associated with the aforementioned reflections, and thus preserves collimation of beam-array 296.

Each protrusion 212 is at least partially in a respective groove 722. Each entrance-port surface 724 faces a respective exit-port surface 214 of beam-stacking plate 200. In a plane that includes symmetry element 204 and when both surfaces 214 and 724 are planar, surfaces 214 and 724 may be parallel, which minimizes reflections of beams 295 exiting exit-port surface 214 and entering entrance-port surface 724. In such embodiments, each of surfaces 214 and 724 may be perpendicular to beam 295 propagating therethrough for minimizing reflections. To facilitate ease mechanical assembly surfaces 214 and 724 may be parallel while not being perpendicular to the propagation direction of beams 295, and conjoined by filling with standard index-matching techniques such as index matching fluid, epoxy, and/or compressible clear material such as optical silicone.

Examples of beam-stacking plate 200 include beam-stacking plate 300 and beam-stacking plate 400 shown on FIGS. 2 and 4 respectively. When light concentrator 701 includes beam-stacking plate 300 (as beam-stacking plate 200), each entrance-port surface 724 may be planar in planes parallel to the y-z plane and be parallel to protrusions 312 of beam-stacking plates 300. When light concentrator 701 includes beam-stacking plate 400 (as beam-stacking plate 200), symmetry element 204 is axis 404 and lower plate 700 is axially symmetric about axis 404. In such embodiments, each entrance-port surface 724 is annular and is concentric about axis 404.

Lower plate 700 has a bottom surface 710 and a thickness 730 between surfaces 710 and 720. In embodiments, thickness 730 decreases, e.g., monotonically, as a function of distance from symmetry element in at least one of directions A1 and A2. A monotonic decrease in thickness precludes the presence of protrusions and recesses in bottom surface 710, each of which would reflect collimated beams 295 at relatively large angles, and hence increase the beam divergence of beam-array 296. Such increased beam divergence would result in decreased coupling efficiency of beam-array 296 into an optical waveguide, such as a slab waveguide or an optical fiber.

FIG. 8 is a schematic cross-sectional view of a light concentrator 801, which is an example of light concentrator 101. Light concentrator 801 includes beam-stacking plate 400 and a reflector 840. Light concentrator 801 may also include a lower plate 800, which is an example of lower plate 700 that is axially symmetric about axis 404. Lower plate 800 has a lower-plate top-surface 820, which is an example of lower-plate top-surface 720. Lower-plate top-surface 820 includes a plurality of surface regions 823 and entrance-port surfaces 824, which are examples of surface-region 723 and entrance-port surfaces 724 respectively.

As disclosed in the description of beam-stacking plate 400, beam-stacking plate 400 converts illumination 290 into annular beams 495 that form beam-array 496. Reflector 840 redirects beam-array 496 as concentrated beam-array 896 that propagate parallel to or substantially parallel (e.g., to within ten degrees) to axis 404. That is, reflector 840 reflects each radially-converging collimated annular beam 495 as a respective reflected one of a plurality of reflected annular beams 895, which form concentrated beam-array 896.

Reflector 840 has a lateral surface 848 and a base width 842. Base width may be less than twice minimum radius 426. Lateral surface 848 may have circular cross-sections in planes perpendicular to axis 404, and the shape of reflector 840 may be that of the lateral surface of a cone or a frustum. Lateral surface 848 may be either (i) rotationally symmetric about axis 404, where the symmetry may be n-fold symmetry (e.g., n 5) or (ii) axially symmetric about axis 404. In a cross-sectional plane that includes axis 404, such as the x-z plane shown in FIG. 8, the section of lateral surface 848 between axis 404 and one-half of base width 842 may be one or more of linear, convex, concave, parabolic, elliptical, and hyperbolic. For example, lateral surface 848 may be an axially symmetric outer surface of a circular paraboloid. Alternatively, lateral surface 848 may be an axially symmetric section of an outer surface of a hyperboloid, where the section is on one side of a symmetry plane, of the hyperboloid, that is perpendicular to the of the hyperboloid's symmetry axis.

In embodiments, reflector 840 is a protrusion of bottom surface 410 of beam-stacking plate 400 and extends away from plate-entrance surface 430. As such, reflector 840 may be part of beam-stacking plate 400, and surface 848 is part of bottom surface 410.

Reflector 840 may include a reflective coating on lateral surface 848, such as a metal coating or a dielectric coating. Alternatively, reflector 840 may function via total-internal-reflection. Lateral surface 848 is a surface of a material of refractive index $n_1$ proximate lateral surface 848. A refractive index of a medium adjacent to lateral surface 848, outside of reflector 840, is $n_2$. An angle between reflective surface 848 and axis 404 is a in a plane that includes axis 404. Each radially-converging collimated annular beam 495 propagates at an angle β with respect to a surface-normal of lateral surface 848. In embodiments, angle β exceeds arcsin $(n_2/n_1)$ such that the reflective surface reflects each radially-converging collimated annular beams via total-internal-reflection.

In embodiments, light concentrator 801 includes a beam concentrator 850, which is an example of secondary concentrator 250 that concentrates beam-array 896 to a point focus 859. In such embodiments, beam concentrator 850 may be coupled to an optical fiber. Point focus 859 is smaller than minimum radius 426. Along axis 404, reflector 840 is between plate-entrance surface 430 and beam concentrator 850. In an example use case scenario, beam concentrator 850 couples each beam 895 to optical fiber 140, FIG. 1. In embodiments, light concentrator 801 includes receiver 260.

Beam concentrator 850 may be, or include, a lens, a solid axially-symmetric tapered waveguide, a hollow axially-symmetric tapered waveguide, and combinations thereof. Beam concentrator 850 may be axially symmetric about axis 404. Beam concentrator 850 has a lateral surface 858, which may be a lateral surface of a cone, or a revolved curved surface such as a paraboloid or a hyperboloid. Beam concentrator 850 may be a compound parabolic concentrator, a compound hyperbolic concentrator, or a trumpet flow-line concentrators.

Reflector 840 may be integrated into lower plate 800. FIG. 9 is a schematic cross-sectional view of a lower plate 900, which is an example of lower plate 800. Lower plate 900 has a lower-plate top-surface 920, which is an example of lower-plate top-surface 820, and includes a surface-region 928 that forms a recess. Surface-region 928 is an example of lateral surface 848, and extends to a radius 923 from axis 404. That is, when light concentrator 801 includes lower plate 900, as surface-region 928 redirects beam-array 496 as concentrated beam-array 896 that propagate parallel to or substantially parallel (e.g., to within ten degrees) to axis 404.

Surface-region 928 extends to an outer radius 923 from axis 404, and may span between axis 404 and radius 923. In embodiments, lower plate 900 includes a protrusion 926. Protrusion 926 has a protrusion-surface 927, which is part of lower-plate top-surface 920 and is surrounded by surface-region 928. Protrusion-surface 927 may be a lateral surface of a cone that is coaxial with axis 404. Protrusion-surface 927 is between axis 404 and an inner radius 913, and may be planar in the x-z plane. In such embodiments, surface-region 928 spans between inner radius 913 and outer radius 923. Protrusion-surface 927 and surface-region 928 define a recess in lower-plate top surface 920 that is radially symmetric about axis 404. In a direction parallel to axis 404, a thickness of lower plate 900 increases, linearly for example, between inner radius 913 and outer radius 923.

Figure 10:
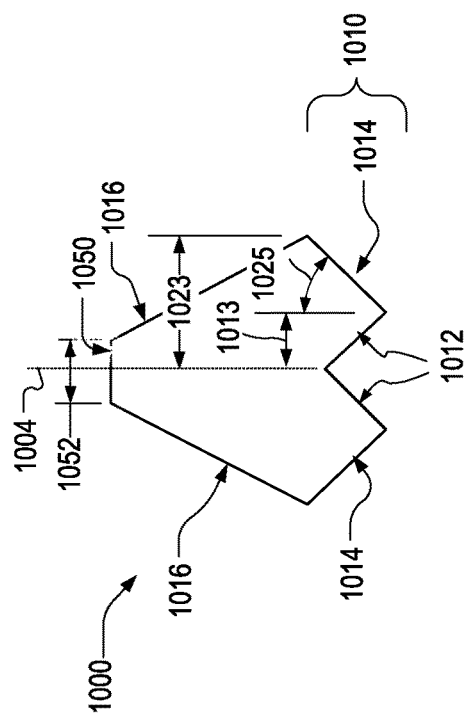
FIG. 10 is a schematic of an inverted conical reflector that is part of embodiments of the light concentrator of FIG. 1.

Embodiments of light concentrator 701 include an inverted conical reflector 1000, FIG. 10. Inverted conical reflector 1000 is axially symmetric about a reflector axis 1004 and includes a bottom reflector-surface 1010 opposite a top reflector-surface 1050. Bottom reflector-surface includes an inner surface-region 1012 surrounded by an outer surface-region 1014. inverted conical reflector 1000 includes an upper surface-region 1016 that spans between outer surface-region 1014 and top reflector-surface 1050. Inner surface-region 1012 is between axis 1004 and an inner radius 1013 and defines a conical recess in bottom reflector-surface 1010 that is symmetric about axis 1004. A thickness of inverted conical reflector 1000 increases, linearly for example, at radial values between axis 1004 and inner radius 1013. Outer surface-region 1014 is located between inner radius 1013 and an outer radius 1023, which may be equal to radii 913 and 923 respectively. A thickness of the inverted conical reflector 1000 decreases, linearly for example, at radial values between inner radius 1013 and outer radius 1023. The shape of outer surface-region 1014 may be that of a lateral surface of a frustum.

Figure 11:
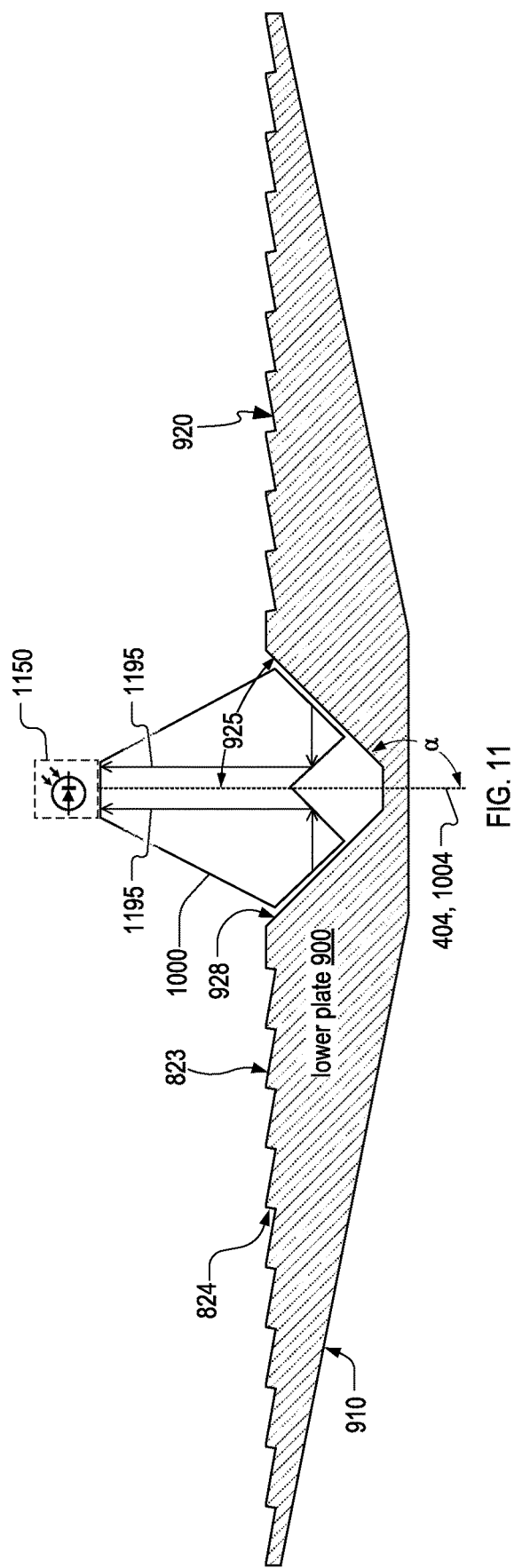
FIG. 11 is a schematic of the inverted conical reflected of FIG. 10 in a recess of the lower plate of FIG. 9, in an embodiment.

Light concentrator 801 may include both lower plate 900 and inverted conical reflector 1000. In such embodiments, inverted conical reflector 1000 fits within a recess formed by surface-region 928 of lower plate 900, as shown in FIG. 11. In such embodiments, axis 1004 and axis 404 are collinear. Inner radius 1013 of inverted conical reflector 1000 may equal inner radius 913 of lower plate 900. Outer surface-region 1014 of inverted conical reflector 1000 is located between inner radius 913 and outer radius 923.

An angle 1025 of outer surface-region 1014 with respect to axis 404 equals an angle 925 between surface-region 928 such that outer surface-region 1014 of inverted conical reflector 1000 mates with surface-region 928 of lower plate 900. In such embodiments, light propagating in lower plate 900 toward axis 404 is either reflected by or transmitted through outer-surface region 928.

A light beam 1195 transmitted by surface-region 928 enters inverted conical reflector 1000 and is reflected upward by inner surface-region 1012 (and, in embodiments, upper surface-region 1016) toward top reflector-surface 1050 of inverted conical reflector 1000. In embodiments, one of surface-region 928 and outer surface-region 1014 has a dichroic coating thereon that reflects a first spectrum of light and transmits a second spectrum of light. The first and second spectra may be the visible and infrared regions of the electromagnetic spectrum, respectively. Top surface 1050 has a width 1052. Width 1052 may be less than twice outer radius 923 of lower plate 900. In such embodiments, inner surface-region 1012 and the outer surface-region 1014 are configured such that light beam 1195 reflected by inner surface-region 1012 reflects off of upper surface-region 1016 before reaching top reflector-surface 1050.

Figure 12:
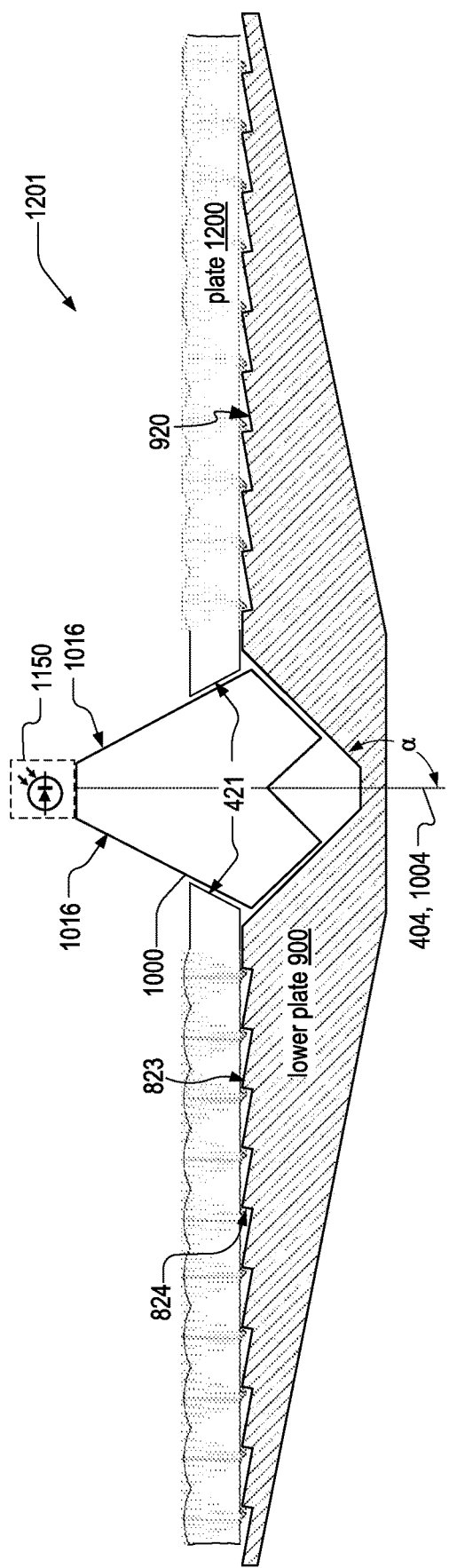
FIG. 12 is a schematic of a light concentrator which is an example of light concentrator of FIG. 8 that includes the lower plate of FIG. 9 and the inverted conical coupler of FIG. 10.

FIG. 12 is a schematic of a light concentrator 1201, which is an example of light concentrator 801 that includes a beam-stacking plate 1200, lower plate 900 and inverted conical reflector 1000. Beam-stacking plate 1200 is an example of beam-stacking plate 400 that includes inner-surface 421, which defines an aperture through beam-stacking plate 1200 centered about axis 404. In embodiments, part of inverted conical coupler 1000 is in the aperture, and inner-surface 421 is tapered such that upper surface-region 1016 mates with inner-surface 421. Light concentrator 1201 may also include a near-IR photodetector 1150 on top reflector-surface 1050 of inverted the conical reflector 1000. Near-IR photodetector 115 may be a solar cell.

Figure 15:
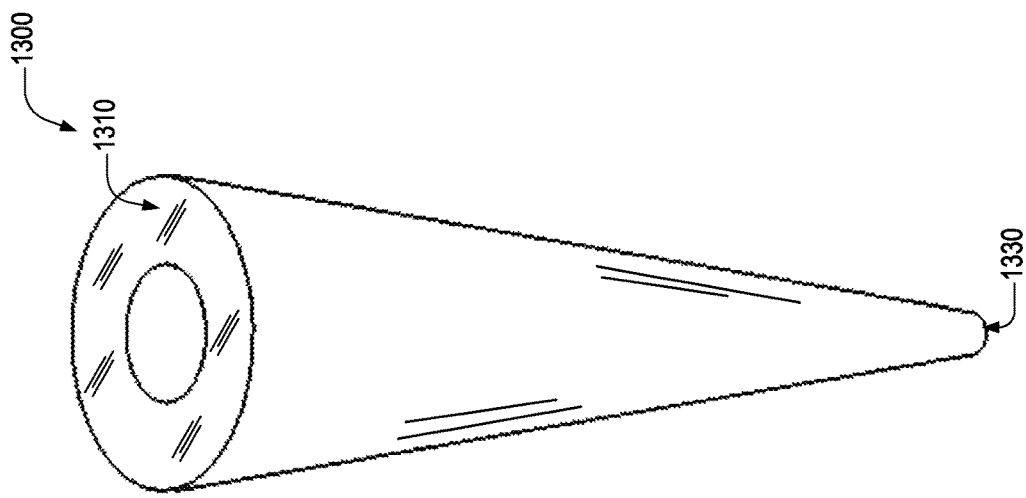
FIGS. 13, 14, and 15 are respective views of a hollow tapered waveguide, which is an example of a fiber coupler of the light concentrator of FIG. 8.
Figure 14:
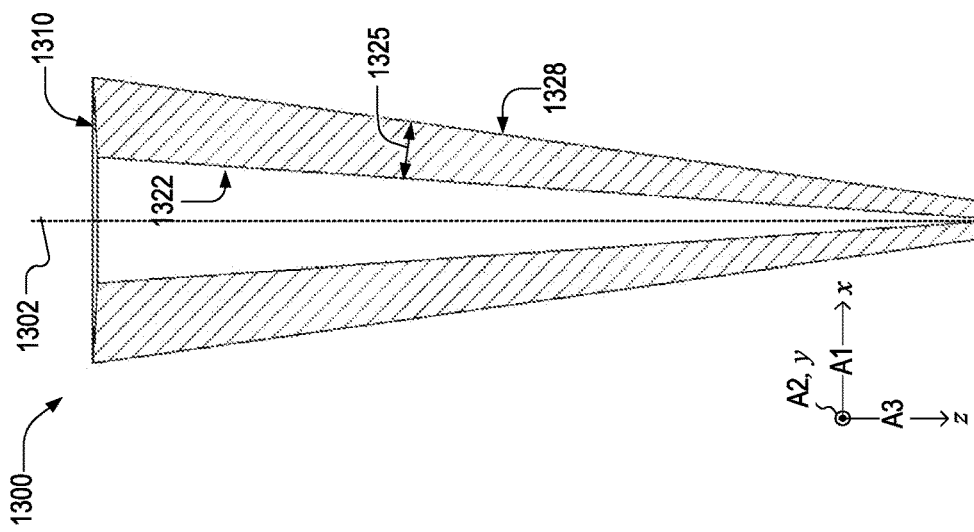
Figure 13:
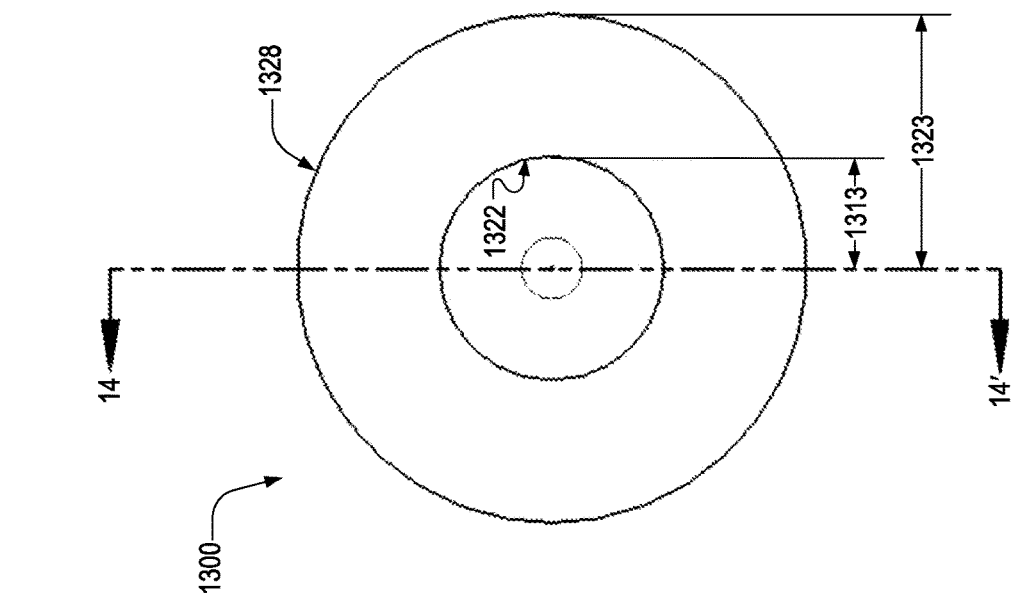

FIGS. 13, 14, and 15 are respective views of a hollow tapered waveguide 1300, which is an example of beam concentrator 850. Hollow tapered waveguide 1300 has a base surface 1310, an inner surface 1322, a lateral surface 1328, and a tip 1330, and is axially symmetric about an axis

1302. Lateral surface 1328 is an example of lateral surface 858. In a cross-sectional plane 14-14' parallel to and including axis 1302, a sidewall thickness 1325 of hollow tapered waveguide 1300 decreases between (i) base surface 1310 of and (ii) tip 1330. Sidewall thickness 1325 is between surfaces 1322 and 1328.

Sidewall thickness 1325 may decrease according to a functional form between base surface 1310 and tip 1330, where examples of the functional form include a linear function, a parabolic function, a hyperbolic function, and an elliptical function. When receiver 260 is an optical fiber, the functional form may be linear or hyperbolic, which is facilitates coupling of point focus 859 into fiber optic cable 140 by reducing the angular-spectrum width of point focus 859. When receiver 260 is a solar cell or a thermal absorber, the functional form may be parabolic, as this functional form generally increases acceptance angle for a given concentration ratio of a hollow tapered waveguide 1300.

Base-surface 1310 has an inner radius 1313 and an outer radius 1323. In embodiments, inner radius 1313 is less than or equal to inner radius 913, and the outer radius 1323 is greater than or equal to outer radius 923 such that all light propagating in lower plate 900 and reflected by either surface-region 928 or 1014 is incident on base surface 1310.

In embodiments, surfaces 1322 and 1328 have different surface shapes. For example, when surfaces 1322 is linear and lateral surface 1328 is curved (e.g. parabolic or hyperbolic) in a vertical plane, surface 1328 wall effectively provides a mirror image to 'double' the ray propagation distance between consecutive alternating ray bounces for a given physical wall thickness 1325.

Figure 16:
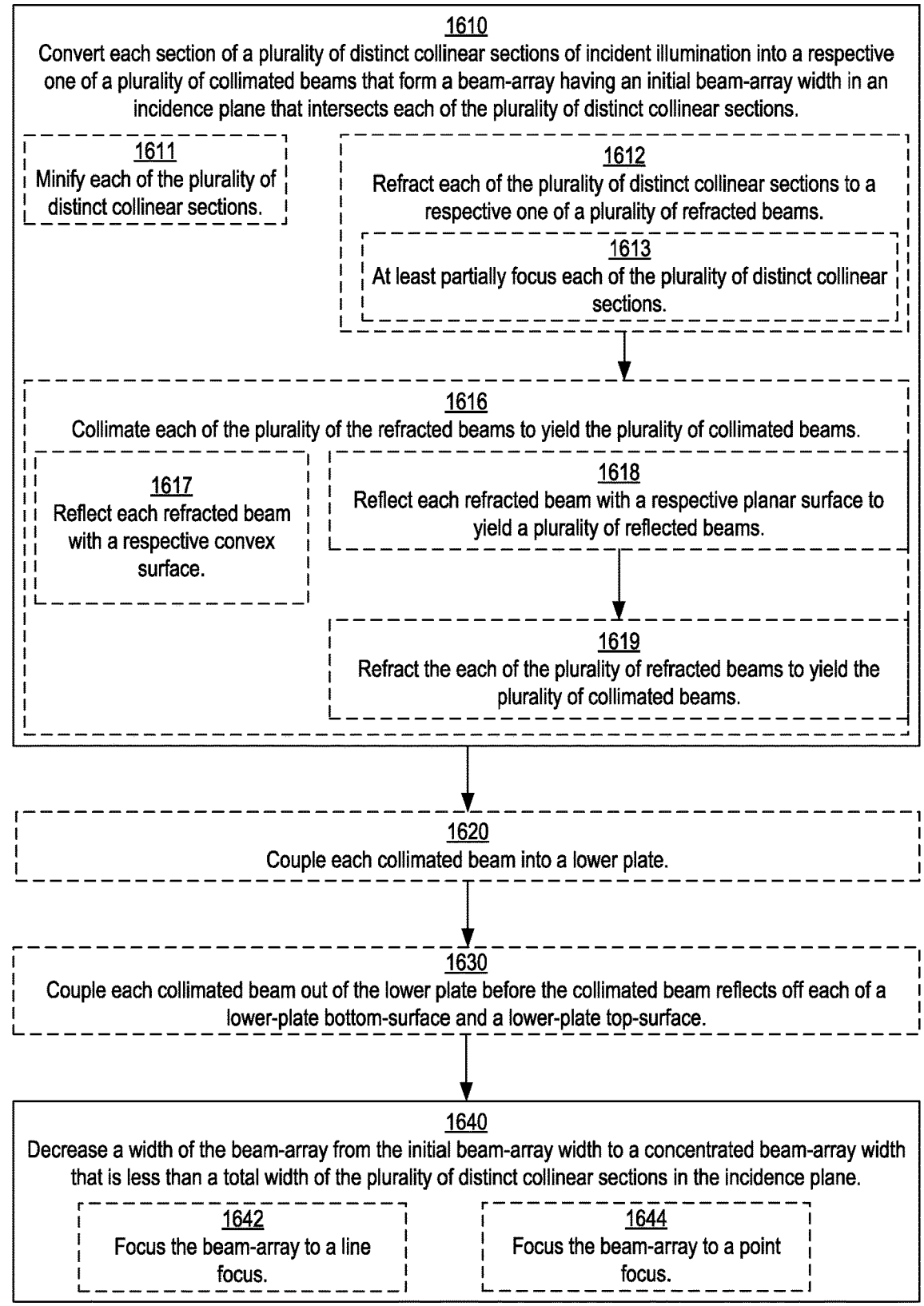
FIGS. 16 and 17 are a flowcharts illustrating a embodiments of respective methods for concentrating light, in embodiments.

FIG. 16 is a flowchart illustrating a method 1600 for concentrating light. Method 1600 may be implemented with at least one embodiment light concentrator 201, which include light concentrators 601, 701, 801, and 1201. Light concentrator 201 includes beam-stacking plate 200, example of which include beam-stacking plates 300 and 400. Method 1600 includes steps 1610 and 1640. Step 1610 may include at least one of steps 1611, 1612, and 1616. Step 1640 may include at least one of steps 1642 and 1644.

Step 1610 includes converting each section of a plurality of distinct collinear sections of incident illumination into a respective one of a plurality of collimated beams that form a beam-array having an initial beam-array width in an incidence plane that intersects each of the plurality of distinct collinear sections. In an example of step 1610, each afocal section 220 converts a respective illumination section 292 to a respective beam 295.

In step 1610, each of the plurality of distinct collinear sections has a respective initial width. Step 1611 includes minifying, in the incidence plane, each of the plurality of distinct collinear sections such that a width of each of the plurality of collimated beams is less than the respective initial width. In an example of step 1611, each afocal section 220 minifies a respective illumination section 292, having initial width 293, to a respective beam 295 that has width 298 that is less than initial width 293.

In embodiments, method 1600 includes both of steps 1612 and 1616. Step 1612 includes refracting each of the plurality of distinct collinear sections to a respective one of a plurality of refracted beams that are non-collimated in the incidence plane. In example of step 1612, each focusing section 229 refracts a respective illumination section 292 to yield a respective uncollimated beam 294. Step 1612 may include step 1613, in which refracting includes at least partially focusing each of the plurality of distinct collinear sections such that, before said collimating, either (a) each of the plurality of refracted beams is converging beam or (b) each of the plurality of refracted beams is a diverging beam.

Step 1616 includes collimating, in the incidence plane, each of the plurality of the refracted beams to yield the plurality of collimated beams. In an example of step 1616, each protrusion 212 collimates a respective uncollimated beam 294.

Step 1616 may include at least one of steps 1617 and 1618. Step 1617 includes reflecting each of the plurality of refracted beams with a respective one of a plurality of convex surfaces to yield the plurality of collimated beams. The reflecting of step 1617 may be via total-internal-reflection or via a mirrored surface. In an example of step 1617, each first surface 213 reflects a respective uncollimated beam 294 to yield a respective collimated beam 295.

Step 1618 may include reflecting each of the plurality of refracted beams with a respective one of a plurality of planar surfaces to yield a plurality of reflected beams. The reflecting of step 1618 may be via total-internal-reflection or via a mirrored surface. In an example of 1618, each first surface 213 of a protrusion 212 is planar and reflects a respective uncollimated beam 294 toward a respective surfaces 214 of the protrusion.

Step 1616 may include both steps 1618 and step 1619. Step 1619 includes refracting the each of the plurality of refracted beams to yield the plurality of collimated beams. In an example of step 1619, each surface 214 collimates a respective uncollimated beam 294 to yield a respective collimated beam 295.

Step 1620 includes coupling each of the plurality of collimated beams into a respective one of a plurality of entrance-port surfaces of a lower plate. Each of the plurality of entrance-port surfaces may be perpendicular to collimated beam incident thereon. In a first example of step 1620, each collimated beam 295 is coupled into a respective entrance-port surface 724 of lower plate 700. In a second example of step 1630, each collimated beam 295 is coupled into a respective entrance-port surface 824 of lower plate 800 or lower plate 900.

Step 1630 includes, for each of the plurality of collimated beams, coupling the collimated beam out of the lower plate before the collimated beam reflects off each of a lower-plate bottom-surface and a lower-plate top-surface of the lower plate. In a first example of step 1630, each collimated beam 295 is coupled out of lower plate 700 before the collimated beam 295 reflects off each (both) of lower-plate bottom surface 710 and lower-plate top surface 720. Each collimated beam 295 may exit lower plate 700 before the collimated beam 295 reflects off of either of lower-plate bottom surface 710 and lower-plate top surface 720. A third example of step 1630 is the same as the first example, except that lower plate 800, surface 810, and surface 820 replace lower plate 700, surface 710, and surface 720, respectively. A third example of step 1630 is the same as the first example, except that with lower plate 900, surface 910, and surface 920 replace lower plate 700, surface 710, and surface 720, respectively.

Step 1640 includes decreasing a width of the beam-array from the initial beam-array width to a concentrated beam-array width that is less than a total width of the plurality of distinct collinear sections in the incidence plane. In an example of step 1640, secondary concentrator 250 decreases a width of beam-array 296 to a width of focal volume 259 that is less than beam-array width 299.

Step 1642 includes focusing the beam-array to a line focus that extends in a direction perpendicular to the incidence plane. In an example of step 1642, secondary concentrator 350 focuses beam-array 396 to line focus 359. Step 1644 includes focusing the beam-array to a point focus. In an example of step 1642, beam concentrator 850 concentrates beams 895 to point focus 859.

Figure 17:
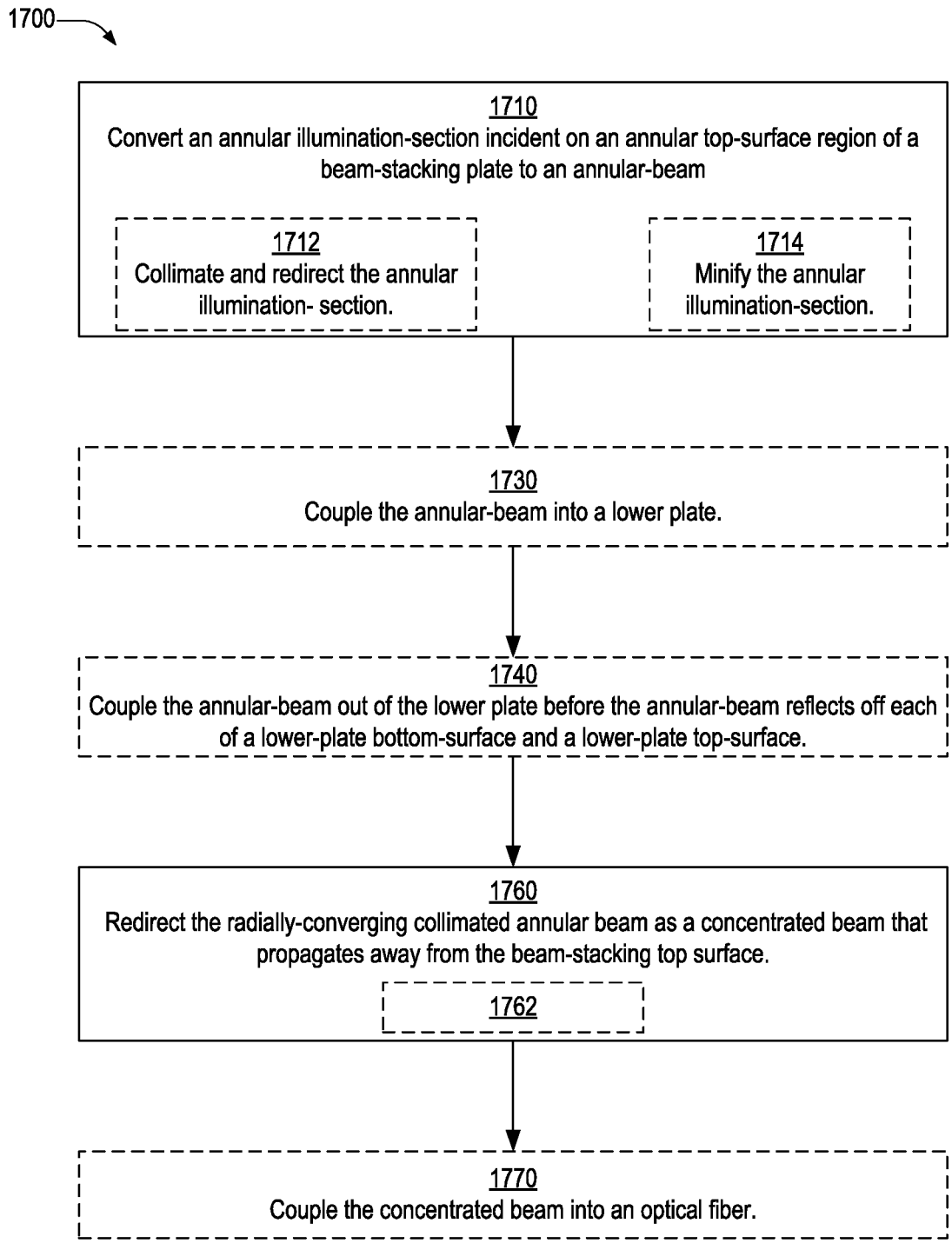

FIG. 17 is a flowchart illustrating a method 1700 for concentrating light. Method 1700 may be implemented with light concentrators 801 or light concentrator 1201. Method 1700 includes steps 1710 and 1760, and may also include at least one of steps 1730, 1740, and 1770.

Step 1710 includes converting an annular illumination-section incident on an annular top-surface region of a beam-stacking plate to an annular-beam. The annular beam (a) propagates radially inward toward a common axis intersecting a center of the annular top-surface region, (b) is collimated in a meridional plane, of the beam-stacking plate, that includes a common axis and (c) is annular in a transverse plane perpendicular to the common axis. In an example of step 1710, and for at least one value of index k, afocal section 420(k) converts illumination section 292(k) to form a radially-converging collimated annular beam 495(k). Herein, k is a positive integer. While k is less than or equal to ten in FIGS. 8 and 10, k may exceed ten without departing from the scope of the embodiments presented herein.

Step 1710 may include at least one of steps 1712 and 1714. Step 1712 includes collimating and redirecting the annular illumination-section with an annular focusing section and a bottom annular protrusion of the beam-stacking plate to yield the annular-beam. In an example of step 1712, and for at least one value of index k, focusing section 429(k) converts illumination section 292(k) to form refracted beam 494(k), and annular protrusion 412(k) redirects and collimates refracted beam 494(k) as radially-converging collimated annular beam 495(k).

Step 1714 includes minifying, in the meridional plane, the annular illumination-section such that a thickness of the annular-beam is less than a thickness of the annular illumination-section. The annular focusing section and the bottom annular protrusion functioning together as an afocal minifying telescope. In an example of step 1714, and for at least one value of index k, afocal section 420(k) minifies illumination section 292(k) to yield radially-converging collimated annular beam 495(k).

Step 1730 includes coupling the annular-beam into a lower plate via an annular entrance-port surface, of the lower plate, that is concentric with the annular focusing section. In an example of step 1730, and for at least one value of index k, radially-converging collimated annular beam 495(k) is coupled into an entrance-port surface 824 of lower plate 800.

Step 1740 includes coupling the annular-beam out of the lower plate before the annular-beam reflects off each of a lower-plate bottom-surface and a lower-plate top-surface of the lower plate. The lower-plate top-surface includes the annular entrance-port surface. In an example of step 1740, light concentrator 801 includes lower plate 900, and reflector 840 couples radially-converging collimated annular beam 495(10) out of lower plate 800 before beam 495(10) reflects off of each of surfaces 910 and 920. For example, and for at least one value of index k, beam 495(k) may propagate directly from entrance-port surface 824 to reflector 840 without reflecting off of either of surfaces 910 or 920. Alternatively, beam 495(k) may reflect off of only surface 910 and then directly to reflector 840 without reflecting off of lower-plate top-surface 920.

Step 1760 includes redirecting the annular-beam as a concentrated beam that propagates away from the beam-stacking plate. In an example of step 1760, and for at least one value of index k, reflector 840 redirects radially-converging collimated annular beam 495(k) as reflected annular beams 895(k).

In embodiments, the collimated beam includes a visible component and an infrared component, which include visible electromagnetic radiation and infrared electromagnetic radiation respectively. In such embodiments, step 1760 may include step 1762. Step 1762 includes redirecting only the visible component of the annular beam as the concentrated beam and (ii) redirecting the infrared component such that it propagates toward the top surface of the beam-stacking plate and substantially parallel to the optical axis.

Step 1770 includes, after step 1760, coupling the concentrated beam to a target. Examples of the target include an optical fiber, a thermal absorber, and a solar cell. Step 1770 may include coupling the concentrated beam into a fiber coupler as a guided mode of the fiber coupler, where the fiber coupler is coupled to the target. In an example of step 1770, and for at least one value of index k, beam concentrator 850 couples reflected annular beam 895(k) into receiver 260.

Figure 18:
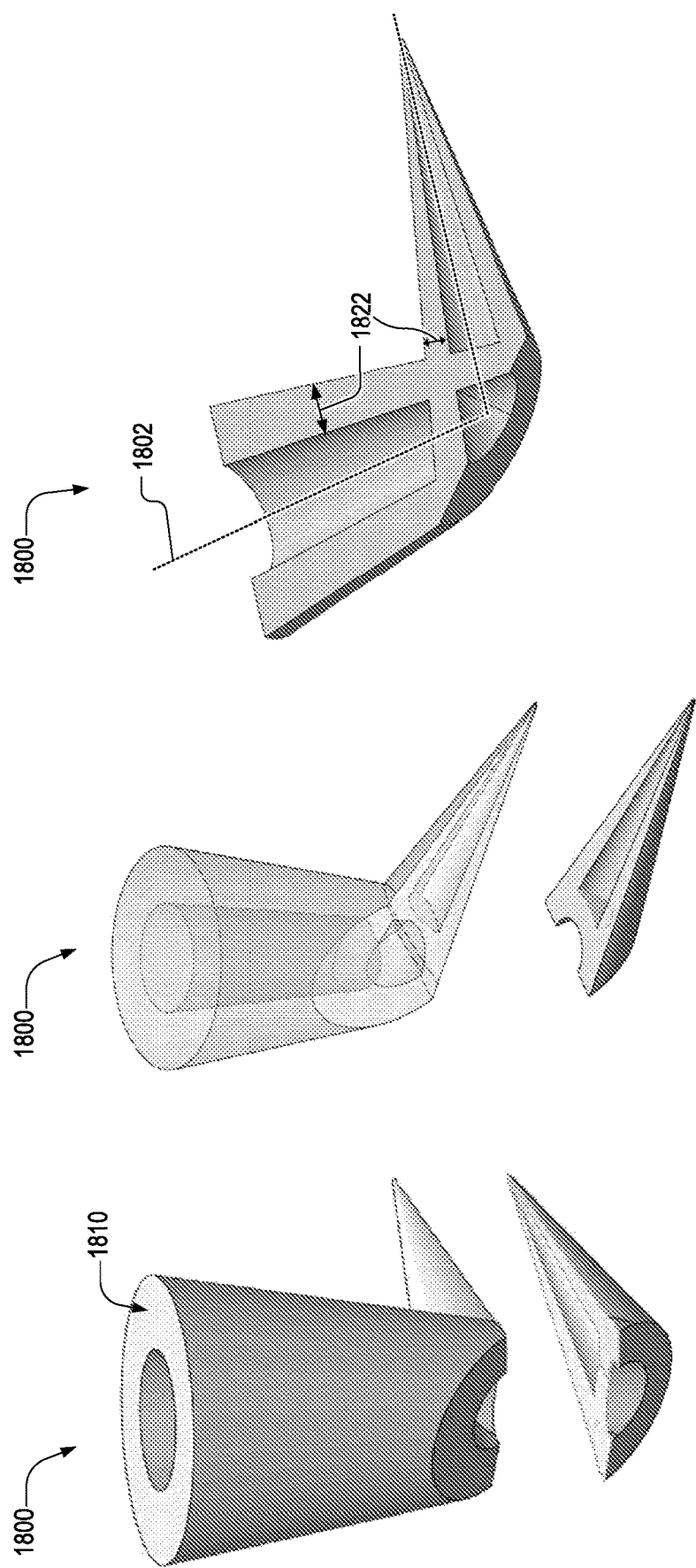
FIGS. 18 and 19 illustrate respective schematics of hollow tapered waveguides, which are examples of the hollow tapered waveguide of FIGS. 13-15.

FIG. 18 illustrates schematics of a hollow tapered waveguide 1800, which is an example of a hollow tapered waveguide 1300 that includes a single fold. Hollow tapered waveguide 1800 has a folded symmetry axis 1802, which is an example of axis 1302. Hollow tapered waveguide 1800 has a base surface 1810 and a tip 1830, which are examples of base surface 1310 and a tip 1330 of hollow tapered waveguide 1300. Waveguide 1800 has a sidewall thickness 1822, which is an example of sidewall thickness 1325. Hollow tapered waveguide 1800 enables beam-stacking plate 200 to be more compact along axis A3.

Figure 19:
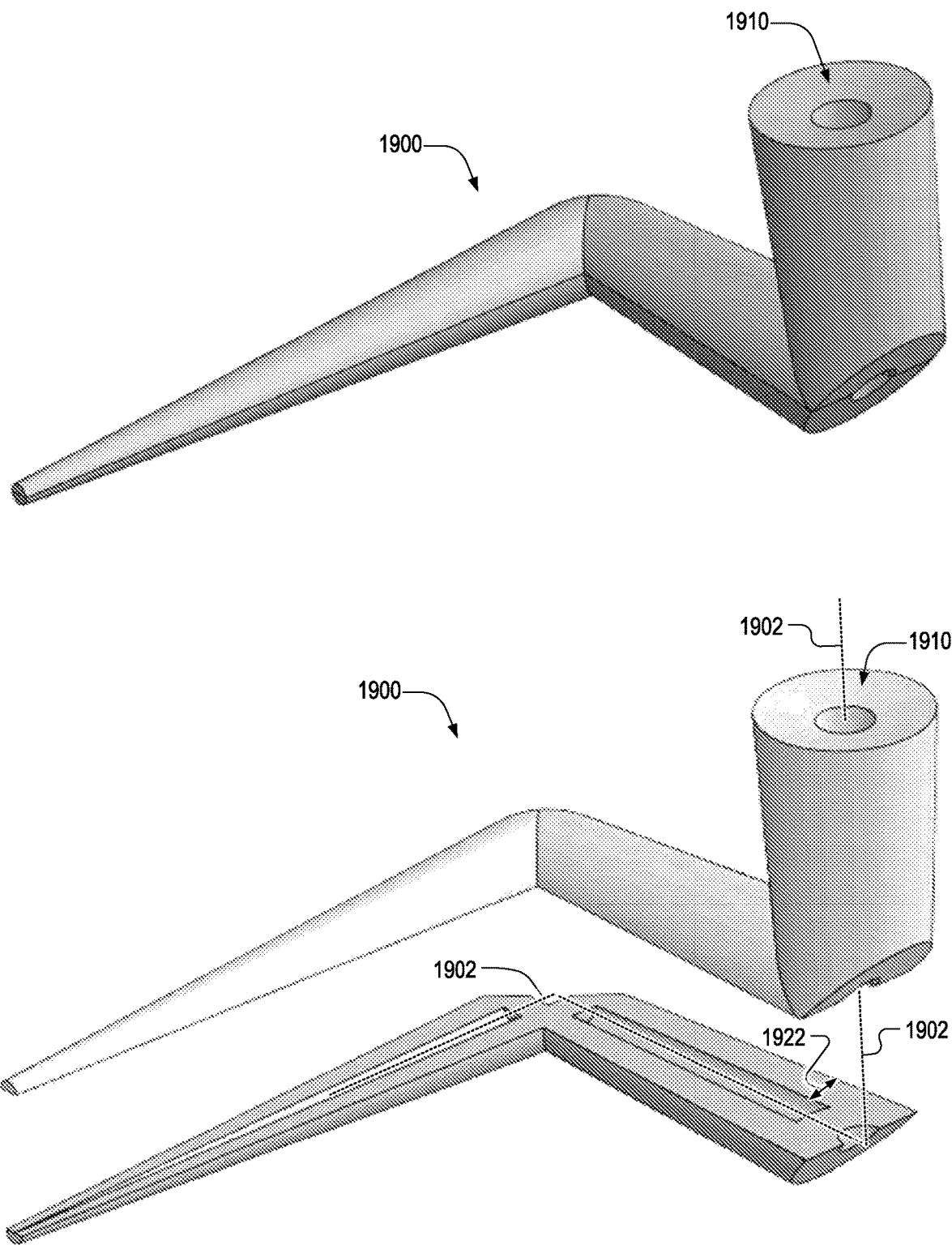

Hollow tapered waveguide 1800 may include additional folds. For example, FIG. 19 illustrates schematics of a hollow tapered waveguide 1900, which is an example of a hollow tapered waveguide 1300 that includes a two folds, or hollow tapered waveguide 1800 with an additional fold. Hollow tapered waveguide 1900 has a twice-folded symmetry axis 1902, which is an example of axis 1302. Hollow tapered waveguide 1900 has a base surface 1910 and a tip 1930, which are examples of base surface 1310 and a tip 1330 of hollow tapered waveguide 1300. Waveguide 1900 has a sidewall thickness 1922, which is an example of sidewall thickness 1325. Hollow tapered waveguide 1900 enables beam-stacking plate 200 to be more compact along axis A3, while additionally providing a lateral translation along axis A2 that may improve receiver 260 routing (such as fiber optics) for desired end use.

Figure 20:
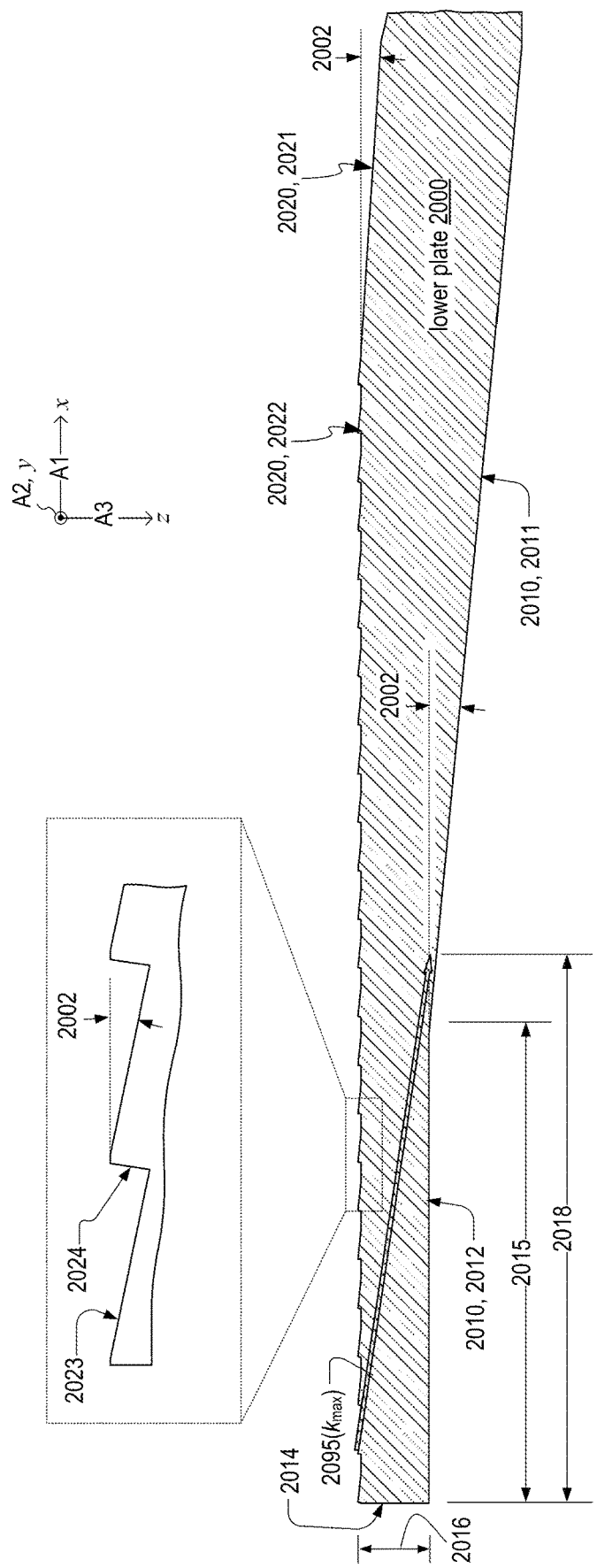
FIG. 20 is a schematic cross-sectional view of a lower plate, which is an example of a lower plate of FIG. 7.

FIG. 20 is a schematic cross-sectional view of a lower plate 2000, which is an example of lower plate 700. Lower plate 2000 has a lower-plate bottom-surface 2010 and a lower-plate top-surface 2020, which are respective examples of surfaces 710 and 720 of lower plate 700. Top-surface 2020 includes a non-coupling region 2021 and a coupling region 2022. Bottom-surface 2010 includes a tapered-region 2011 and a non-tapered region 2012. Tapered-region 2011 begins at distance 2015 from an edge-surface 2014 of lower plate 2000. Lower plate 2000 has a thickness 2016 between non-tapered region 2012 and top-surface 2020.

Coupling region 2022 includes a plurality of surface-regions 2023 and entrance-port surfaces 2024, which are respective examples of surface-regions 723 and entrance-port surfaces 724. To reduce divergence of beam-array 296, each of tapered-region 2011, non-coupling region 2021, and surface-regions 2023 is oriented at an angle 2002 with respect to a horizontal plane.

FIG. 20 illustrates a beam $2095(k_{max})$ propagating in lower plate 2000 after entering lower plate 2000 via an outer-most entrance-port surface 2040. Beam $2095(k_{max})$ is an example of collimated beam 295. Part of beam 2095 ($k_{max}$), propagating at the largest angle with respect to axis A1, reflects off of tapered-region 2011 at a distance 2018 from edge-surface 2014. Each beam 2095 has an angular spectrum, the peak of which corresponds to a propagation angle $\theta_{2095}$, the central propagation angle of beams 2095. When angle 2002 equals $\theta_{2095}$, beam $2095(k_{max})$ propagates parallel to tapered region 2011, while its most downward divergent ray is incident on tapered region 2011 at distance 2018. Thus tapered-region 2011 effectively preserves the propagation direction of beam $2095(k_{max})$, such that the propagation direction of beam $2095(k_{max})$ remains parallel to beams $2095(k<k_{max})$.

Manufacturing requirements place an upper limit on thickness 2016, such that tapered-region 2011 cannot extend to edge-surface 2014. Distance 2015 is therefore greater than zero, while also being less than distance 2018 such that beam $2095(k_{max})$ is incident on tapered-region 2011. Thickness 2016 may be determined by balancing a tradeoff between compactness of light concentrator 201 and minimum thickness requirements for processes used, e.g., injection molding, for fabricating lower plate 2000. In embodiments, thickness 2016 is between one millimeters and three millimeters, for example, between 1.5 mm and 2.0 mm.

Figure 21:
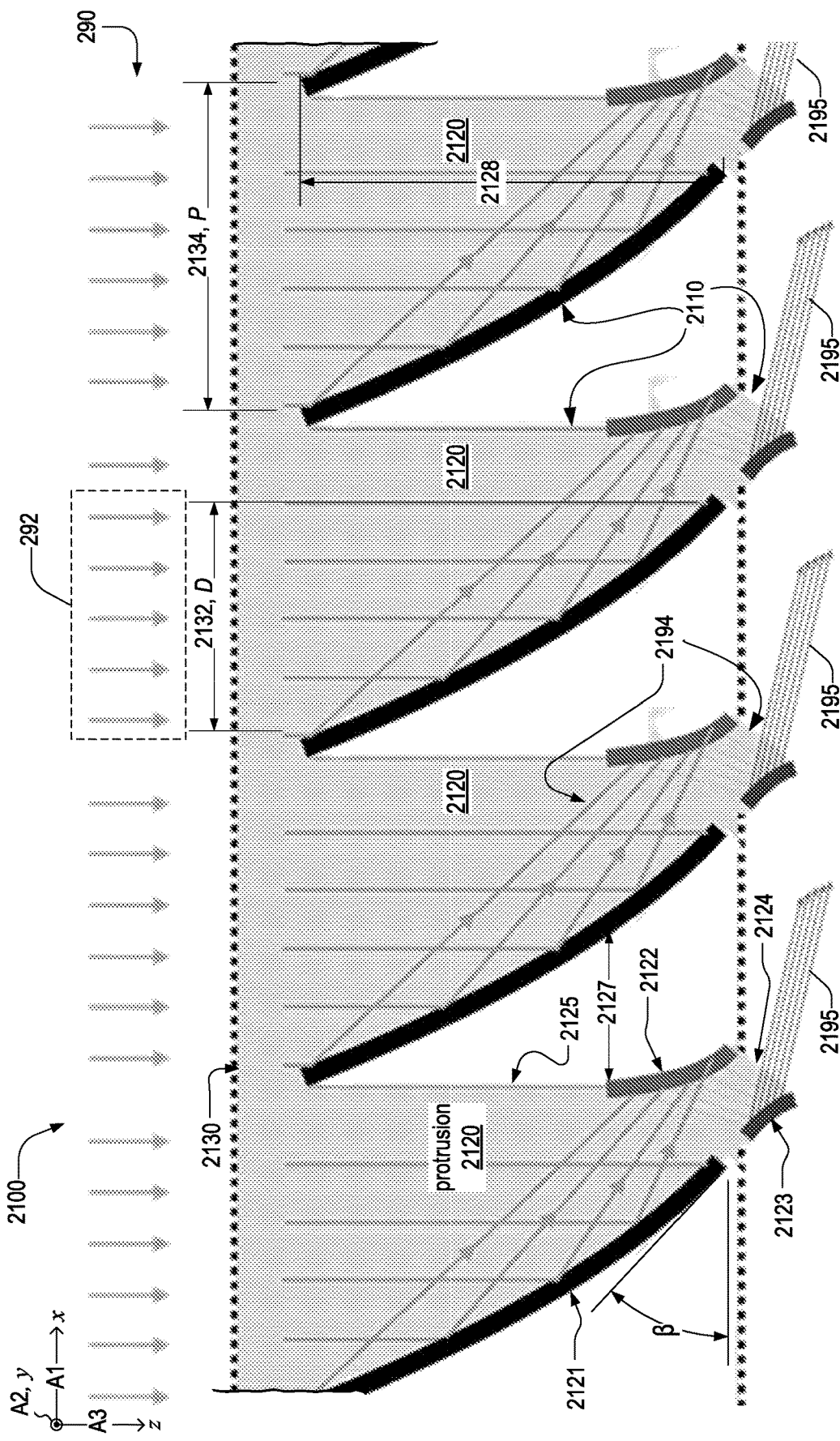
FIG. 21 is a schematic cross-sectional view of part of a beam-stacking plate, which is an example of the beam-stacking plate of FIG. 2.

FIG. 21 is a schematic cross-sectional view of part of a beam-stacking plate 2100, which is an example of beam-stacking plate 200. Beam-stacking plate 2100 has a bottom surface 2110 and a plate-entrance surface 2130, which are respective examples of exit-surface 210 and plate-entrance surface 230. Plate-entrance surface 2130 may be planar.

Bottom surface 2110 includes a plurality of protrusions 2120. Each protrusion 2120 is an example of an afocal section 220, has a refractive index $n_1$. In the example of FIG. 22, beam-stacking plate 2100 is in an ambient medium that has a refractive index $n_2$.

Protrusion 2120 includes surface regions 2121-2125, each of which is part of bottom surface 2110. At least one of surface regions 2121-2124 may be parabolic. Surface region 2125 may be perpendicular to plate-entrance surface 2130, which allows there to be no gap between surface-region 2122 of a first protrusion 2120 and surface region 2212 of an adjacent protrusion 2120 along axis A1. Surface 2124 is an example of exit-port surface 214.

FIG. 21 illustrates beam-stacking plate 2100 collimating illumination 290 into a plurality of collimated beams 2195, each of which are examples of collimated beams 295. Each illumination section 292 of illumination 290 is incident on a region of plate-entrance surface 2130 that has a width 2132 (herein also D), which is determined by the width of a vertical projection of surface-region 2121 on to plate-entrance surface 2130. Protrusions 2120 are spaced at a pitch 2134 (herein also P, which is greater than or equal to width 2132.

Surface-region 2121 reflects and focuses illumination section 292 toward surface region 2122 as an uncollimated beam 2194, which is converging between surface-regions 2121 and 2122. Uncollimated beam 2194 is an example of uncollimated beam 294. Surface-region 2122 reflects uncollimated beam 2194 toward surface-region 2123, which reflects uncollimated beam 2194 as a collimated beam 2195.

In embodiments, and as shown in FIG. 21 surface-region 2121 is internally concave, surface-region 2122 is internally convex and diverges uncollimated beam 2194, and surface-region 2123 is internally convex. Surface-region 2122 may be planar or internally concave without departing from the scope of the embodiments herein. Surface 2124 may be planar. At least one of surface-regions 2121-2123 may be, or function as, an off-axis parabolic reflector.

In embodiments, surface-region 2121 is internally concave, and may be parabolic. When surface-region 2121 is internally concave, a consequence of this concavity is that the slope-magnitude (absolute value of the slope) of surface-region 2121 decreases as a function of distance from plate-entrance surface 2130 along axis A3. That is, surface-region 2121 becomes less vertical as a function of increasing distance from plate-entrance surface 2130. FIG. 21 denotes an angle $\beta$ between the least sloped part of surface-region 2121 and the vertical direction. In embodiments, to ensure that all of surface-region 2121 reflects illumination section 292 via total-internal-reflection, angle $\beta$ exceeds critical angle $\theta_c = \arcsin(n_2/n_1)$.

At least one of surface-regions 2121, 2122, and 2123 may have an inward-facing reflective coating thereon, such that above-mentioned TIR condition need not be satisfied. The coating may be a metal coating, a dielectric coating, or a combination thereof.

In embodiments, the axis of a best-fit parabola to surface-region 2121 may be perpendicular to plate-entrance surface 2130 and/or parallel to the propagation direction of illumination section 292. Surface-region 2121 may be parabolic, such that the best-fit parabola defines surface-region 2121. The focal length of the best-fit parabola, hereinafter also f, is the distance from the parabola's vertex and focus. In embodiments, f is between D/10 and 2D.

A benefit of f exceeding D/10 is to reduce the slope-magnitude of surface-region 2121 (such that it is closer to horizontal) for improved manufacturability, and increase ratio of width 2132 to a vertical height 2128 of surface-region 2121. Increasing this ratio achieves greater afocal de-magnification within standard plate manufacturing thickness and feature sizes. A benefit of f being less than 2D is increase collection efficiency (~D/P) by enabling surface-region 2122 to be closer to surface-region 2121 along axis A1. As a result, the ratio of width 2132 to pitch 2134 increases.

In embodiments, f is between D/5 and D. An additional benefit of f exceeding D/5 (and not merely exceeding D/10) is to provide additional distance to position surface-region 2122 away from surface-region 2121 with rotational freedom to achieve a variety of reflecting angles whereby uncollimated beam 2194 strikes surface-region 2123 over a broad range of angles while avoiding interference with surface-region 2121. An additional benefit of f being less than D (and not merely being less than 2D) is that surface-region 2122 becomes small enough to be freely rotated (in the x-z plane) to achieve a variety of reflecting angles to surface-region 2123 without interference of ray vignetting by surface-region 2121 or physical interference of surface-region 2122 with an adjacent surface-region 2121 (right-adjacent in FIG. 21). That is, a distance 2127 between surface-region 2122 and an adjacent surface-region 2122 becomes too small.

APPENDIX

Overview of Embodiments

Embodiments herein include non-imaging concentrators (light concentrator 201) for relatively collimated (far-field) illumination, that employs optical waveguiding, spectral control, and multiple stages of processing. Architecturally, embodiments include of three stages of optical processing:

(1) a first plate (e.g., beam-stacking plate 200) to compress incident light into an array of parallel adjacent beams, (2) a waveguiding structure (lower plates 700, 800, 900) to accept and contain the beams, and (3) a secondary optical concentrator (e.g., secondary concentrator 250) to further concentrate the light from the waveguide.

The array of optical systems may be arranged in a lenticular pattern (composed of adjacent cylindrical optics) to perform a 1-D concentration (beam-stacking plates 300), or revolved into a concentric pattern (composed of concentric annular apertures and toroidal surfaces) to perform a 2-D concentration (beam-stacking plate 400).

Beam-Stacking Plate

The following description applies to certain, but not all, instances of beam-stacking plate 200. Incident illumination to be concentrated falls upon beam-stacking plate 200, which performs a form of optical concentration we call beam-stacking. Beam-stacking plate 200 may be composed of an array of optical systems, each of which contains (1) an afocal telescope to create a collimated minified beam of the incident light, and (2) a steering element that redirects beams at an angle such that the minified beams are each parallel and adjacent to the next in the array.

Afocal Telescope Optics. In general, afocal optical systems preserve collimation, meaning they produce no net convergence or divergence of incident light. However, afocal systems may induce a magnification operation, such that the width of light exiting the system is either larger (magnified) or smaller (demagnified or minified) than the entrance aperture. As some embodiments are intended as an optical concentrator, the beam-stacking plate may include afocal telescopes that demagnify (minify) incident illumination.

Although afocal optical systems preserve light collimation, in-fact few optical light sources are perfectly collimated. Instead, the incident optical radiation is described by a divergence angle which defines the outer angular extent (e.g. the sun has a divergence half-angle of roughly 0.26°). When divergent light is place through an afocal telescope, the divergence increases by 1/M. So, for an afocal 10× magnification (with no aberrations), the resulting divergence will be 0.026°, while for a 10× minification the resulting divergence will be 2.6°. For the sake of this invention, when we say 'collimated', we are in fact including this natural divergence process.

Beam-Stacking Condition. We now describe the 'Beam-Stacking' operation of the optical redirecting operation of beam-stacking plate 200. The intent of Beam Stacking is to fold the direction of propagation such that the minified beams remain parallel in propagation, yet are now adjacent to each other.

An array of adjacent minifying telescopes, each spaced apart by a Lens Pitch, will produce an array of minified beams with space in-between (aka 'dilute' spacing) of approximately=Lens Pitch×(1−1/Magnification). The Beam-Stacking condition implies that all beams are tilted at the same angle such that these beams are no longer dilute spaced, but now adjacent (touching). The redirection angle at which this happens is defined by the magnification, and given by $\theta_{Fold}$=arcsin(Beam Width/Lens Pitch)=arcsin(1/Magnification).

Construction of the described structure may require additional space for tooling radii and manufacturing tolerances, which will be added to the Beam Width. Thus, the resulting folding angle for beam stacking will slightly increase to $\theta_{Fold}$=arcsin((Beam Width+Tooling)/Lens Pitch). For example, a 10× minifying telescope with 1.5-mm Lens Aperture that requires an additional 0.025-mm of tooling radii per tooth will require $\theta_{Fold}$=arcsin((0.150+0.025)/1.5)=6.7°.

Lower Plate

The following description applies to certain, but not all, instances of lower plates 700, 800, and 900. Waveguides contain electromagnetic radiation inside. In the optical regime this may be performed by standard reflectors, but more commonly Total Internal Reflection (TIR) by use of a low-loss dielectric medium (such as optically clear glass or plastic) that has an index of refraction higher than the surrounding medium which may be either be air or a variety of low-index polymers (e.g. fluoropolymers).

Waveguide Intent. In embodiments, lower plate 700 is designed to capture the radiation propagating from first beam stacking plate in the smallest possible aperture (to preserve concentration) while preserving beam collimation (to preserve angular modes).

The waveguide may be extended beyond the optical collection area, into what we call a "passive region" of the beam-stacking plate, which does not collect any additional radiation. For example, lower plate 800 extends beneath a region of beam-stacking plate 400 that is enclosed by the inner-most annular afocal section, afocal section 420(1). However, for axially-revolved concentrator geometries, extending propagation distance of a parallel waveguide structure will effectively increase collection area (and thus total concentrator area) per width 291 without increasing thickness (e.g., width 299) and thus provide identical illumination through waveguide thickness 730 and coupling performance to receiver 260. This will in effect increase device total concentration ratio at the expense of total collector aperture fill factor (ratio of collected light to physical area).

Entrance Features. To reduce Fresnel reflections off of the top surface (lower-plate top-surface 720), a 'sawtooth array' of physical apertures (grooves 722) may be employed to receive the beams to reduce reflections by steepening interface angle, or in embodiments enable a physical dielectric connection to eliminate reflections entirely.

Waveguide Geometry. In embodiments, an optimal geometry of the waveguide top and bottom surfaces (720, 710) are parallel to the direction of beam-stacking folding angle. In this case, lower plate 700 will both retain the minimum width of all aggregated beams (beams 295), and will not impart additional divergence (angular modes) as rays divergent to the central fold angle strike consecutive upper and lower surfaces.

Additionally, when the upper wave-guide 'ceiling' surface is aligned parallel to the central Folding angle, and adjacent to the beam diameter, it acts as a mirror which "folds" all upward divergent light back downward—effectively reducing the total beam divergence by half, and thus easing downstream compression.

Similarly, embodiments that employ a wedged surface on the wave-guide bottom 'floor' (lower-plate bottom-surface 710) reduces angular deviation of a single bounce (that does not subsequently also strike the ceiling). Compared to a flat floor (perpendicular to the incident rays), a wedged floor will reduce divergent beam spreading of reflected rays by $\theta_{Fold}/2$. Practical molding considerations indeed have a minimum thickness (often between 0.5 mm and 2.5 mm), thus such a wedged floor may begin after the outermost downward divergent ray strikes the minimum moldable thickness, as depicted in FIG. 20.

Waveguide Redirection and/or Beam Shaping

In embodiments, the waveguiding structure (lower plate 700) may terminate with an optical surface to redirect and/or shape the optical propagation before reaching the intended Receiver.

Redirection. Redirection is defined as changing the central direction of propagation, and useful for architectures where opposing waveguide slabs with counter-propagating radiation must be steered into the same receiver aperture.

The simplest form is a flat fold mirror, constructed from a reflective surface (or preferably using TIR within a dielectric waveguide, e.g., lower plate 700), which preserves waveguide collimation and thickness—thus performing a pure redirection operation. For lenticular array of 1-D concentrators (beam-stacking plate 300), the redirection may be performed with a simple flat surface that is tilted with respect to the axis of slab width. For a revolved 2-D concentrator of annular telescopes (beam-stacking plate 400), the folding surface is instead revolved with radial symmetry into a cone.

Numerical Aperture & Effective F #. In optics, the Numerical Aperture (NA) of a lens is a dimensionless quantity which characterizes the range of angles to accept or emit light, and may be calculated by dividing the lens focal length by diameter, $NA=n \sin \theta = n(D/2f)$. Light gathering is also commonly described by complimentary metric F-Number, where $F\#=f/D$. In embodiments, both the resulting output NA and F # is independent of the input light gathering, and instead defined by location of the Folding surface with respect to the common central axis (axis 404).

For counter-propagating lenticular arrays each providing 1-D concentration, two flat folding surfaces may redirect each side towards the same aperture, as in light concentrator 601. Similarly, 'revolved' architectures with 2-D concentration (e.g., reflector 840) where the flat folding surface may be revolved with radial symmetry (e.g., axial symmetry) into a cone to focus all incident beams onto the same spot.

In either case, a central receiver (e.g., beam concentrator 850) placed in a plane below the waveguide folding surfaces will receive the light at a spread of angles defined by the distance to the receiver ($f_{eff}$) and distance between the folding surfaces ($D_{eff}$). For waveguides converging radially-inward towards folding surfaces placed near the central axis, the Effective F # will be considerably larger (i.e. NA considerably smaller) than the outer diameter of light gathering. This property effectively shortens device effective focal length, and is extremely useful for coupling light into receiver targets with small NA such as fiber optics in a flat surface. Conversely, folding surfaces placed axially outside the collection array will increase NA (decrease F/#) for a given part length.

Spectral Splitting & Cogeneration. As the afocal the beam stacking waveguide (beam-stacking plate 200) preserves collimation, we may successfully replace the folding surface with (angularly selective) a multi-layer interference filter (e.g., a dichroic beamsplitter) for cogeneration or spectral shaping. The filter may be on one of surface-region 928 of lower plate 900 and outer surface-region 1014 of conical coupler 1000.

Solar Cogeneration generally implies multiple energy operations simultaneously performed with different spectral components. In this regard, a dichroic beamsplitter may reflect one portion of the solar spectrum downward towards a central receiver below (e.g., receiver 260), while a second central optic with another TIR folding optic may send the remaining radiation upward.

In embodiments, visible components of solar illumination (having the sun's visible spectrum) may be sent downward toward fiber optic cable 140 for lighting, while the infrared heat (solar illumination at wavelengths exceeding 700 nm) may be radiated towards a photovoltaic chip at high concentration (FIG. 11). An arbitrary interference filter spectrum may be employed to provide a particular spectrum through one port (e.g. reflected by outer-surface region 928), with the remaining complimentary spectrum transmitted through the other port (transmitted by outer-surface region 928 and reflected by inner surface-region 1012, FIG. 11). As such, a spectral filtering operation may be performed by simply ejecting the unwanted spectrum away from the desired receiver.

Bi-Directional Transceiver. Another application of spectral selectivity is to take advantage of optical bi-directionality, and for a 2-channel optical transceiver for free space communications applications. Here, the spectrally-selective beamsplitter is used to separate different frequencies of wavelength-modulated signals, however each group is propagating in opposing flows. For example, one group of signals with wavelengths $\lambda_1$-$\lambda_n$ arrive incident upon the concentrator device (light concentrator 201) and are directed to flow downward to a detector (e.g., receiver 260) at one port. In an different port (e.g., surface 1050 of conical coupler 1000), a WDM source (such as a laser diode) with frequencies of $v_1$-$v_n$ transmits information backwards through the dichroic, which goes upstream through the waveguide, and is now expanded (collimated) through the afocal telescope array. As received and transmitted information share the same aperture, the information will be automatically transmitted back towards the same direction it was received for bi-directional communication.

Beam Shaping. The Fold surface (e.g., surface 848) may be of arbitrary shape to further process incident radiation. As the incident radiation is highly collimated, employing common any variety of curved optical surfaces (e.g. circular, parabolic, elliptical, hyperbolic, free-form surface, etc.) will re-image the incident waveguide light with minimal aberration. In embodiments, an off-axis parabolic reflector provides an additional stage of concentration of the light towards the receiver focus. For counter-facing 1-D lenticular slabs sharing a common receiver (FIG. 3), these off-axis segments would also be lenticular parabolic surfaces, with their focal points aligned. In embodiments of a 2-D concentrator architecture, the parabolic surface would be revolved into a toroidal parabolic, sharing a common central focus (e.g., examples of surface 848).

When coupled into a subsequent tapered dielectric waveguide structure (e.g., beam concentrator 850), use of these curved reflection surfaces for intermediate Beam Shaping effectively acts as a standard 'Field Lens' by converging light at system entrance aperture. The result is that the convergent light has a reduced number of wall reflections, thus preserving phase (i.e. having less angular spreading and/or providing similar concentration for a shorter waveguide taper).

Dielectric Waveguide Condenser.

A waveguide condenser is a term for a dielectric structure with converging walls to concentrate radiation. Embodiments herein may employ use of such a structure, (e.g., secondary concentrator 250) before the final receiver(s) to further increase concentration of the illumination (or when used in reverse, preserve phase front of transmitted information). This mechanical and monolithic waveguiding approach is further useful as it eliminates concerns with free-space misalignment of independent optics and Fresnel reflection losses into the receiver. Non-imaging concentrators are furthermore commonly understood to provide concentration ratios two to four times beyond free-space counterparts as stray rays are collected.

The taper profile may be constructed with converging walls that (in an axial plane for axially symmetric condensers) are flat and sloped (i.e. 'linear taper'), or a variety of curved surfaces such as parabolic ('CPC'), hyperbolic ('CHC'), ellipsoidal ('CEC'), free-form, etc. For the counter-propagating 1-D architecture these may be lenticular surfaces, while the 2-D architecture may revolve these shapes into their 3-D counterparts such as hollow tapered waveguide 1300 (i.e. a linear taper is revolved into a cone, a parabolic taper is revolved into a paraboloid, etc.)

Counter-propagating waveguides may be reflected into a common dielectric waveguide structure. However, in embodiments, phase may be preserved (to reduce angular mode spreading) by use of independent opposing tapers (for 1-D concentrator architectures) or a hollow, revolved waveguide concentrator (for 2-D revolved concentrator architectures). Employing the use of a hollow surface in-between counter-propagating sides reduces the reflection angle between far walls, and thus reduces the angular increase between subsequent wall reflections. If useful, this hollow section may terminate before the end of the tapered waveguide, thus converging into a common 'crossover' portion prior to receiver aperture.

Configurations and Examples

Beam-stacking Plate. Embodiments of beam-stacking plate 200 may include a number of configurations. Beam-stacking plate 200 may be a single plate (or monolithic stacked assembly of plates). For adequate transmission, the beam-stacking plate 200 may be composed of transparent materials, such as common optical glasses and plastics (e.g. PMMA, COP, Polycarbonate, Zeonex, optical silicone, etc.).

Ideally for low-cost fabrication, beam-stacking plate 200 may be designed for automated, replicative process such as extruding and injection molding (e.g. plastics), hot stamped/pressed (e.g. silicone on glass), or CNC diamond turning (e.g. glasses). Common injection molding techniques require average substrate thicknesses of generally no less than 0.5 mm, no more than 8 mm, and typically between two and five millimeters. Accordingly, beam-stacking plate 200 may have a thickness between 0.5 mm and 8 mm, e.g., between 2 mm and 5 mm along axis A3. Extrusions may be employed for one-dimensional (lenticular) arrays in most optical polymers and some soft glasses, and generally may be thicker from 5 mm up to 35 mm in thickness.

Dioptric Telescopes—(purely Refractive). Dioptric optical systems rely on purely refractive bending of light by lenses and prisms. A single plate with two sides may only form the most basic forms of dioptric afocal telescopes, namely: the Keplerian and Galilean. Both types employ two curved surfaces separated by the sum of their focal lengths, however the Keplerian uses two positive (convex) lenses which create a real focal point of crossed rays, whereas the Galilean uses both a positive (convex) and negative (concave) lens that creates a virtual focal point.

A monolithic substrate may be molded with these surfaces on each side to form a telescope plate. However, by definition, dioptric optical systems do not employ any reflective surfaces, and thus the optical redirection operation must be with an additional surface. One embodiment depicts a first lens (focusing section 229) focusing towards a folding mirror surface (first surface 213) within the TIR angle, which may either be located before, at or after the first lens focal point.

Note that light on incident upon the opposite side of the optical axis from folding direction has a more grazing angle upon the mirror surface and may more easily satisfy the TIR condition than light incident from the same side. A primary lens with lower F/# will have greater light gathering for a given length, but also steepen this opposing ray, limiting TIR condition. In some embodiments, the repeating array of lenses may be shifted off-axis to reduce this dependency while maintaining larger light gathering.

In either case, the subsequent reflected radiation is then collimated by a second refractive element (exit-port surface 214) located appropriately along (or off-axis to) the folded optical path to realize the appropriate telescopic condition (i.e. convex/positive focal length for Keplerian, concave/negative focal length for Galilean). The resulting collimated beam exits the first beam stacking plate to head towards the aggregating waveguide.

Catadioptric Telescopes (Refractive+Reflective). Catadioptric optical systems are defined as those that employ both refractive and reflective optical surfaces. One challenge of the dioptric (purely refractive) designs is that it terminates in a curved refractive surface resulting in a Fresnel reflection loss at both the first plate exit, and waveguide entrance. Furthermore, even aspheric refractive surfaces made out of a single material suffer chromatic aberration that reduces downstream collimation. Reflective surfaces do not suffer chromatic aberration, and may furthermore 'fold' systems to reduce volume.

In embodiments A catadioptric architecture of beam-stacking plate 200 follows the first positive refractive lens surface (surface 232) with a curved reflective surface (surface 213) designed to both simultaneously collimate and fold the incident illumination (illumination section 292) to satisfy the beam stacking condition. This approach provides design freedom to the output surface to physically interface with the subsequent waveguide aperture and avoid Fresnel reflection losses. Furthermore, replacing a refractive surface with reflection reduces the overall system chromatic aberration, and if generated as a free-form surface may also be used to reduce other off-axis aberrations such as coma.

In embodiments, the curved reflective surface (surface 213) is internally convex (externally concave), forming a Galilean telescope via a negative focal length. This form both requires a thinner propagation length (for similar light gathering) while using more grazing angles upon the reflecting surface to better satisfy the TIR condition. However, as the case with the dioptric architectures, limiting the aperture to off-axis rays only, the TIR condition may be extended for higher F/#. While a concave curved reflective surface may be employed (as surface 213), its positive focal length creates longer, Keplerian telescope and suffers worse TIR geometry for reduced F/# for given aperture.

Catoptric Telescopes—(Reflective). Catoptric optical systems employ only reflective elements, and by removing all refraction entirely eliminate chromatic aberration. Furthermore, multi-element catoptric may use multiple 'folding' surfaces to compress total telescope volume, and employ several (three or more) off-axis (or free-form) surfaces to totally negate all aberrations and provide diffraction-limited performance. Common Three-mirror anastigmat (TMA) or triplet arrangements employ the first two reflectors to eliminate spherical aberration and coma, with the third surface to eliminate astigmatism and flatten field curvature. Such ability for aberration correction enables increased function over a greater FOV than simple two mirror designs, and wide flexibility of output angle steering for satisfaction of the redirecting operation required for beam-stacking. Standard TMA arrangements of positive-negative-positive (concave-convex-concave) elements may be employed for flattened field, as well as positive-negative-negative (concave-convex-convex) to reduce path length.

Common challenges with large (e.g. astronomical) catoptric telescopes include higher sensitivity to surface figure that increases expense of construction/alignment, and off-axis requirements may affect imaging systems. However, an optical concentrator does not require imaging, and employing curved TIR surfaces within small injection-molded parts enables replication with precision and repeatability.

In embodiments, three or more curved reflective surfaces may be made with air-gap features that satisfy conditions for TIR. The primary reflector is a concave (positive) mirror composed of an off-axis parabolic (or similar, free-form, etc.) pointed to receive light predominantly collimated and perpendicular to top surface, with sloped surfaces <450 than acceptance angle for TIR. Reflected light shines sideways towards curved secondary TIR mirror, which reflects light downward towards third mirror surface at bottom of plate that finally sends collimated light in appropriate folding angle for beam stacking.

Spatial dimensions. Optically, most spherical refractive surfaces faster than F/2 begin to exhibit unworkable aberration, while aspheric refractive surfaces may approach F/1. Similarly, simple two-element dioptric telescopes suffer poor optical quality for magnifications significantly greater than ten, while magnifications of corrected catadioptric systems may extend to between fifteen and twenty before degradation.

As an example, an embodiment of beam-stacking plate 200 constructed with common injection molding methods would be limited between 2-5 mm of thickness. Thus, a 10× Galilean telescope (dioptric or catadioptric) constructed with an F/3 first lens (focusing section 229) for reduced optical aberration and TIR folding angles would enable a maximum first lens width (lens pitch) in the range of 1.5 mm to 1.75 mm in at least one of directions A1 and A2 (while a Keplerian architecture would be smaller), and result in an exit beam having a width 298 between 150 micrometers and 175 micrometers. In these systems, first lens diameters (width 228) may be made much smaller (250 micrometers to one millimeter) to employ lower f-numbers or larger magnifications, however with diminishing returns and extremely small output beams/features which are challenging to manufacture and align.

Changes may be made in the above light concentrators and light-concentration methods without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present light concentrators and light concentration methods, which, as a matter of language, might be said to fall therebetween.

What is claimed is:

1. A method for concentrating light comprising:
   converting each section of a plurality of distinct collinear sections of incident illumination into a respective one of a plurality of collimated beams that form a beam-array having an initial beam-array width in an incidence plane that intersects each of the plurality of distinct collinear sections; and
   decreasing a width of the beam-array from the initial beam-array width to a concentrated beam-array width that is less than a total width of the plurality of distinct collinear sections in the incidence plane.

2. The method of claim 1, each of the plurality of distinct collinear sections having a respective initial width, converting comprising:
   minifying, in the incidence plane, each of the plurality of distinct collinear sections such that a width of each of the plurality of collimated beams is less than the respective initial width.

3. The method of claim 1, decreasing a width comprising focusing the beam-array to a line focus that extends in a direction perpendicular to the incidence plane.

4. The method of claim 1, converting comprising:
   refracting each of the plurality of distinct collinear sections to a respective one of a plurality of refracted beams that are non-collimated in the incidence plane; and
   collimating, in the incidence plane, each of the plurality of the refracted beams to yield the plurality of collimated beams.

5. The method of claim 4, refracting comprising at least partially focusing each of the plurality of distinct collinear sections such that, before said collimating, either (a) each of the plurality of refracted beams is converging beam or (b) each of the plurality of refracted beams is a diverging beam.

6. The method of claim 4, collimating comprising: reflecting, via total-internal-reflection, each of the plurality of refracted beams with a respective one of a plurality of convex surfaces to yield the plurality of collimated beams.

7. The method of claim 4, collimating comprising:
   reflecting, via total-internal-reflection, each of the plurality of refracted beams with a respective one of a plurality of planar surfaces to yield a plurality of reflected beams; and
   refracting the each of the plurality of refracted beams to yield the plurality of collimated beams.

8. The method of claim 1, in said step of converting, each of the plurality of collimated beams propagates in a respective one of a plurality of second directions that differs from a propagation direction of the incident illumination by at least forty-five degrees, a maximum difference between any pair of the plurality of second directions being less than ten degrees.

9. The method of claim 1, the initial beam-array width being less than the total width.

10. The method of claim 1 in said step of converting,
    each of the plurality of distinct collinear sections (i) having a finite extent in a direction perpendicular to the incidence plane, and (ii) being parallel in the direction perpendicular to the incidence plane,
    a width of each of the plurality of collimated beams being equal to the finite extent.

11. A method for concentrating light comprising:
    converting an annular illumination-section incident on an annular top-surface region of a beam-stacking plate to an annular-beam that (a) propagates radially inward toward a common axis intersecting a center of the annular top-surface region, (b) is collimated in a meridional plane, of the beam-stacking plate, that includes a common axis and (c) is annular in a transverse plane perpendicular to the common axis; and redirecting the annular-beam as a concentrated beam that propagates away from the beam-stacking plate.

12. The method of claim 11, further comprising, after redirecting, coupling the concentrated beam into a fiber coupler as a guided mode of the fiber coupler.

13. The method of claim 11, converting comprising:
collimating and redirecting the annular illumination-section with an annular focusing section and a bottom annular protrusion of the beam-stacking plate to yield the annular-beam; and
minifying, in the meridional plane, the annular illumination-section such that a thickness of the annular-beam is less than a thickness of the annular illumination-section, the annular focusing section and the bottom annular protrusion functioning together as an afocal minifying telescope.

14. The method of claim 11, further comprising:
coupling the annular-beam into a lower plate via an annular entrance-port surface, of the lower plate, that is concentric with the annular focusing section.

15. The method of claim 14, the lower plate having a lower-plate bottom-surface opposite a lower-plate top-surface that includes the annular entrance-port surface, and further comprising, before redirecting the annular-beam:
coupling the annular-beam out of the lower plate before the annular-beam reflects off each of the lower-plate bottom-surface and the lower-plate top-surface.

16. The method of claim 11, the annular top-surface region being one of a plurality of concentric annular top-surface regions of the beam-stacking plate, the annular illumination-section being one of a plurality of annular sections incident on a respective one of the plurality of concentric annular top-surface regions, converting comprising:
converting each of the plurality of annular sections into a respective one of a plurality of annular-beams that each propagate at a respective one of a plurality of angles, with respect to the common axis, that are substantially equal.

17. The method of claim 16, coupling the annular-beam further comprising:
coupling each of the plurality of annular-beams into a lower plate via a respective one of a plurality of annular entrance-port surfaces, of the lower plate, that concentric with the annular top-surface region.

18. The method of claim 17, redirecting comprising:
redirecting each of the plurality of annular-beams as a respective one of a plurality of concentrated beams that propagate away the beam-stacking plate.

19. The method of claim 18, redirecting comprising reflecting each of the plurality of annular-beams via total-internal-reflection.

20. The method of claim 17, the lower plate having a lower-plate bottom-surface opposite a lower-plate top-surface that includes the plurality of annular entrance-port surfaces, and further comprising, for each of the plurality of annular-beams:
coupling the annular-beam out of the lower plate before the annular-beam reflects off each of the lower-plate bottom-surface and the lower-plate top-surface.

\* \* \* \* \*